United States Patent
Kang et al.

(10) Patent No.: US 9,706,106 B2
(45) Date of Patent: Jul. 11, 2017

(54) MOBILE TERMINAL AND METHOD OF CONTROLLING THE SAME

(71) Applicant: LG ELECTRONICS INC., Seoul (KR)

(72) Inventors: Hyeongu Kang, Seoul (KR); Jiwon Yun, Seoul (KR); Jongkyeong Park, Seoul (KR); Nikolay Akatyev, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 14/765,172

(22) PCT Filed: Sep. 30, 2014

(86) PCT No.: PCT/KR2014/009198
§ 371 (c)(1),
(2) Date: Jul. 31, 2015

(87) PCT Pub. No.: WO2016/035921
PCT Pub. Date: Mar. 10, 2016

(65) Prior Publication Data
US 2016/0255268 A1    Sep. 1, 2016

(30) Foreign Application Priority Data

Sep. 5, 2014   (KR) .................. 10-2014-0119215

(51) Int. Cl.
*H04N 5/232* (2006.01)
*G06F 3/14* (2006.01)
(Continued)

(52) U.S. Cl.
CPC ....... *H04N 5/23216* (2013.01); *G06F 3/0488* (2013.01); *G06F 3/04842* (2013.01);
(Continued)

(58) Field of Classification Search
CPC .......... H04N 5/23216; H04N 5/23293; H04N 5/2257; G06F 3/04845; G06F 3/04883;
(Continued)

(56) References Cited

U.S. PATENT DOCUMENTS

2010/0020221 A1* 1/2010 Tupman .............. G06F 3/04883
348/333.01
2010/0026721 A1    2/2010 Park et al.
(Continued)

FOREIGN PATENT DOCUMENTS

KR    10-2010-0013106 A    2/2010
KR    10-2013-0143372 A    12/2013
(Continued)

OTHER PUBLICATIONS

International Search Report dated May 11, 2015 issued in Application No. PCT/KR2014/009198.

*Primary Examiner* — Mekonnen Dagnew
(74) *Attorney, Agent, or Firm* — KED & Associates, LLP

(57) ABSTRACT

Provided are a mobile terminal having an image capturing function and a method of controlling the same. The mobile terminal includes: a camera; a display unit configured to output a preview image received through the camera; and a control unit configured to, when a portion of a region on which the preview image is output is selected, output a pop-up window including the preview image corresponding to the portion, in a state in which the preview image is output, wherein when a preset type of touch is applied to the pop-up window, the control unit may magnify or reduce the preview image corresponding to the portion in the pop-up window.

19 Claims, 23 Drawing Sheets

(51) Int. Cl.
*G06F 3/0484* (2013.01)
*G06F 3/0488* (2013.01)
*H04N 5/225* (2006.01)

(52) U.S. Cl.
CPC ...... *G06F 3/04845* (2013.01); *G06F 3/04847* (2013.01); *G06F 3/04883* (2013.01); *G06F 3/14* (2013.01); *H04N 5/2257* (2013.01); *H04N 5/23293* (2013.01); *H04N 5/23296* (2013.01); *G06F 2203/04806* (2013.01); *G06F 2203/04808* (2013.01)

(58) Field of Classification Search
CPC ............... G06F 3/0488; G06F 3/04842; G06F 3/04847; G06F 3/14; G06F 2203/04806; G06F 2203/04808
See application file for complete search history.

(56) References Cited

U.S. PATENT DOCUMENTS

| | | | |
|---|---|---|---|
| 2011/0279388 | A1 | 11/2011 | Jung et al. |
| 2013/0314580 | A1* | 11/2013 | Ju ..................... H04N 5/23222 |
| | | | 348/333.11 |
| 2014/0063053 | A1* | 3/2014 | Jung ............... H04M 1/274508 |
| | | | 345/629 |
| 2015/0062376 | A1* | 3/2015 | Ohnishi ................. H04N 1/212 |
| | | | 348/231.2 |

FOREIGN PATENT DOCUMENTS

| | | |
|---|---|---|
| KR | 10-2014-0089866 A | 7/2014 |
| WO | WO 2014/129813 A1 | 8/2014 |

\* cited by examiner

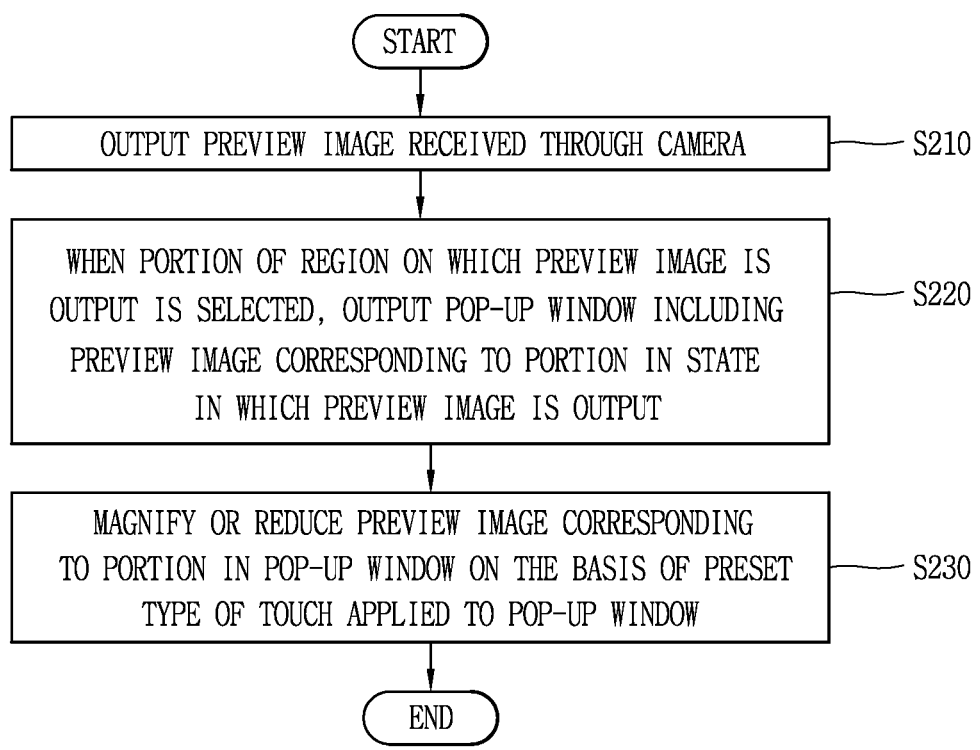

MOBILE TERMINAL AND METHOD OF CONTROLLING THE SAME

CROSS-REFERENCE TO RELATED PATENT APPLICATIONS

This application is a U.S. National Stage Application under 35 U.S.C. §371 of PCT Application No. PCT/KR2014/009198, filed Sep. 30, 2014, which claims priority to Korean Patent Application No. 10-2014-0119215 filed Sep. 5, 2014, whose entire disclosures are hereby incorporated by reference.

BACKGROUND OF THE INVENTION

1. Field of the Invention

The present disclosure relates to a mobile terminal having an image capturing function and a method of controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. For example, a user interface environment allowing users to easily and conveniently search for and select functions is provided.

Also, recently, as resolution and functions of cameras provided in mobile terminals have enhanced, utilization or cameras provided in mobile terminals has increased.

SUMMARY OF THE INVENTION

Therefore, an aspect of the detailed description is to provide a mobile terminal capable of providing a graphic user interface (GUI) optimized for an image capturing function, and a method of controlling the same.

Another aspect of the detailed description is to provide a mobile terminal capable of executing various image capturing functions using a pop-up window, and a method of controlling the same.

Another aspect of the detailed description is to provide a mobile terminal capable of providing an optimized zoom function using a pop-up window, and a method of controlling the same.

To achieve these and other advantages and in accordance with the purpose of this specification, as embodied and broadly described herein, a mobile terminal may include: a camera; a display unit configured to output a preview image received through the camera; and a control unit configured to, when a portion of a region on which the preview image is output is selected, output a pop-up window including the preview image corresponding to the portion, in a state in which the preview image is output, wherein when a preset type of touch is applied to the pop-up window, the control unit may magnify or reduce the preview image corresponding to the portion in the pop-up window.

In an exemplary embodiment of the present disclosure, the control unit may select the portion on the basis of a preset type of touch applied to the region on which the preview image is output.

In an exemplary embodiment of the present disclosure, when the preset type of touch applied to the region on which the preview image is output is a long touch, the control unit may set a portion having a reference size centered on a point to which the long touch has been applied.

In an exemplary embodiment of the present disclosure, when the preset type of touch applied to the region on which the preview image is output is a drag touch, the control unit may set a region corresponding to a closed curve formed by a trace of the drag touch, as the portion.

In an exemplary embodiment of the present disclosure, when a preset type of touch applied to the region on which the preview image is output is a pinch-out touch, the control unit may set the portion with respect to points to which the pinch-out touch has been applied.

In an exemplary embodiment of the present disclosure, a position in which the pop-up window is output may be determined on the basis of a position of the portion.

In an exemplary embodiment of the present disclosure, magnifying or reducing the preview image corresponding to the portion in the pop-up window may be performed according to varying of a size of the portion on the basis of a preset type of touch applied to the pop-up window.

In an exemplary embodiment of the present disclosure, the preset type of touch applied to the pop-up window may include at least one of a pinch-in touch and a pinch-out touch, and the size of the portion may be increased when the pinch-in touch is applied to the pop-up window and decreased when a pinch-out touch is applied to the pop-up window.

In an exemplary embodiment of the present disclosure, the control unit may change the size of the portion such that the preview image corresponding to the portion is magnified or reduced, centered on a point to which the preset type of touch has been applied.

In an exemplary embodiment of the present disclosure, the control unit may change the size of the portion in a state in which a size of the pop-up window is maintained.

In an exemplary embodiment of the present disclosure, an indicator indicating the portion may be displayed on the display unit, and the indicator may be formed to correspond to the edge of the portion.

In an exemplary embodiment of the present disclosure, the size of the portion may be changed on the basis of a drag touch starting from the indicator, and an image corresponding to the portion changed in size may be displayed in the pop-up window.

In an exemplary embodiment of the present disclosure, when the size of the portion is equal to or greater than that of the pop-up window, the control unit may control the display unit to make the pop-up window disappear.

In an exemplary embodiment of the present disclosure, in a state in which the pop-up window is output, the control unit may execute an image capturing function on the basis of a touch applied to at least one of the region on which the preview image is output and a region on which the pop-up window is output.

In an exemplary embodiment of the present disclosure, the control unit may capture the preview image when a touch is applied to the region on which the preview image is output, capture the preview image corresponding to the portion when a touch is applied to the region on which the pop-up window is output, and capture a screen itself output on the display unit when touches are applied to both the region on which the preview image is output and the region on which the pop-up window is output.

In an exemplary embodiment of the present disclosure, the control unit may execute different image capturing functions on the preview image and the pop-up window.

In an exemplary embodiment of the present disclosure, in a state in which the pop-up window is output, when a touch is applied to the pop-up window while video is being captured on the preview image, the control unit may capture a still image of the preview image corresponding to the portion.

In an exemplary embodiment of the present disclosure, the control unit may display at least one portion corresponding to a graphic object included in the preview image such that the at least one portion is distinguished, and output at least two pop-up windows corresponding to at least two portions selected from among the at least one displayed portion.

In an exemplary embodiment of the present disclosure, preview images corresponding to the at least two selected portions may be output on the at least two pop-up windows, respectively, and the control unit may combine the at least two pop-up windows such that the preview images corresponding to the at least two selected portions are output in a single pop-up window on the basis of a user request.

To achieve these and other advantages and in accordance with the purpose of this specification, as embodied and broadly described herein, a method of controlling a mobile terminal may include: outputting a preview image received through a camera; when a portion of a region on which the preview image is output is selected, outputting a pop-up window including a preview image corresponding to the selected portion, in a state in which the preview image is output; and magnifying or reducing the preview image corresponding to the selected portion in the pop-up window on the basis of a preset type of touch applied to the pop-up window.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flow chart illustrating a control method according to an exemplary embodiment of the present disclosure.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
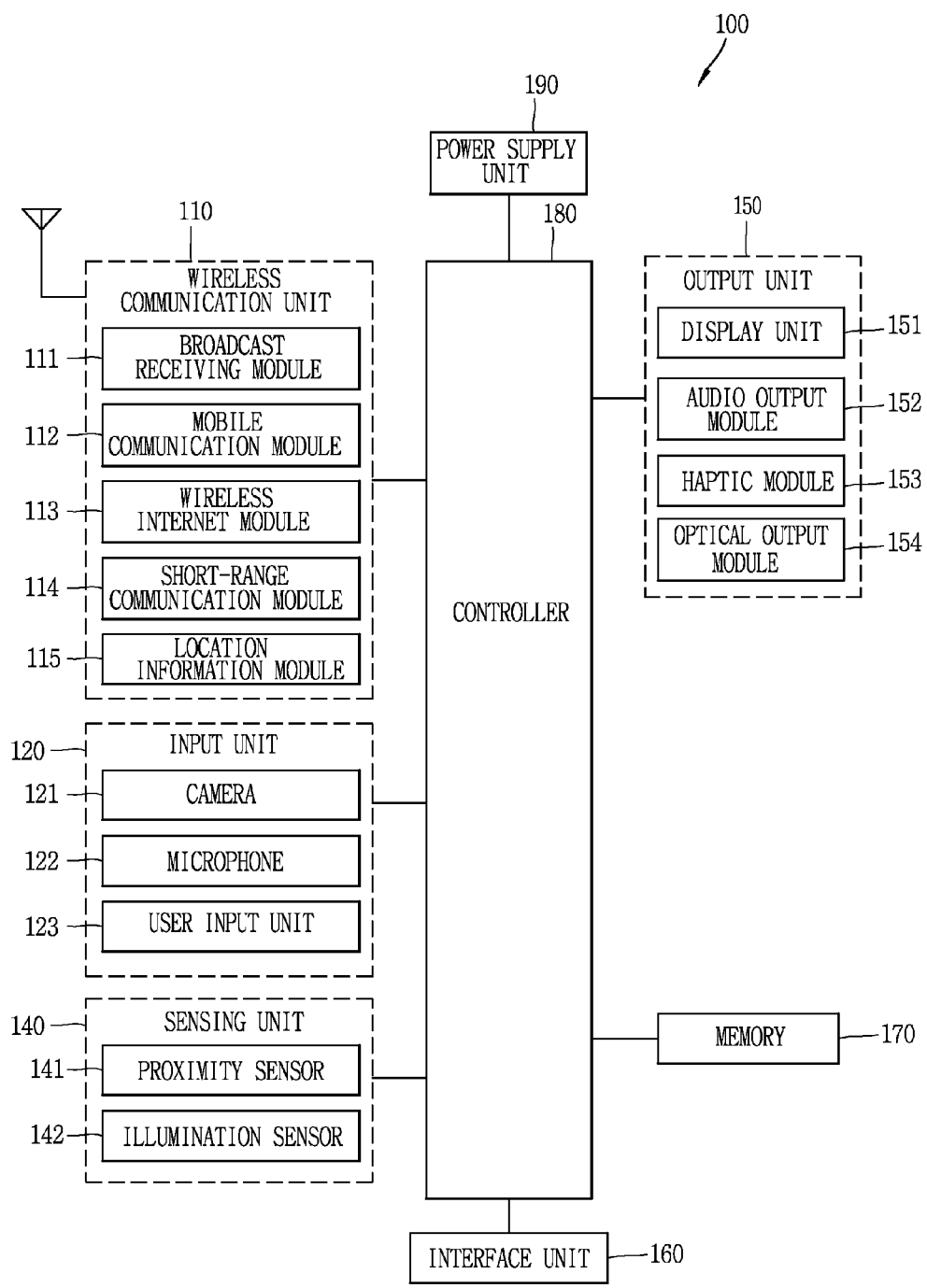
FIG. 1A is a block diagram of a mobile terminal according to an exemplary embodiment of the present disclosure.
Figure 1B:
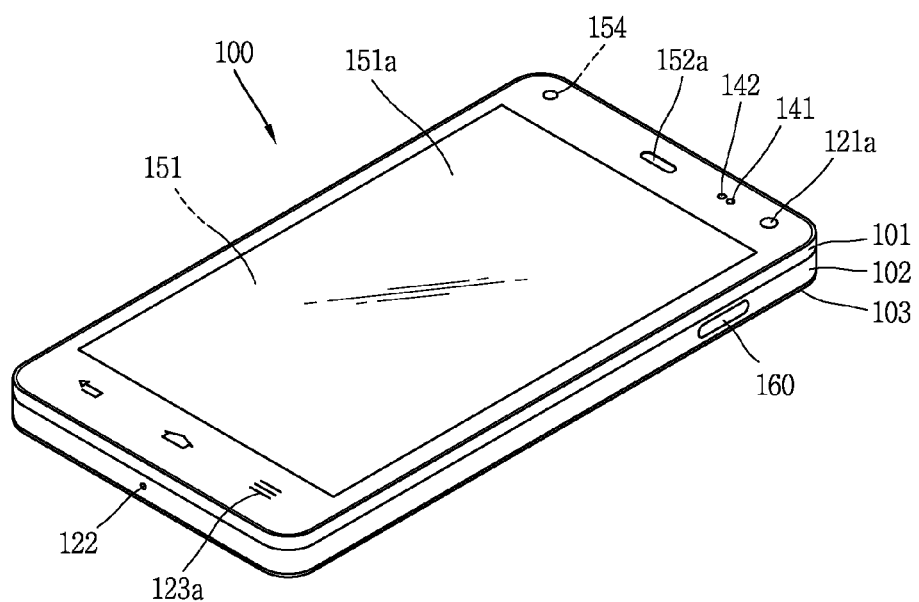
FIGS. 1B and 1C are conceptual views of one example of the mobile terminal, viewed from different directions.
Figure 1C:
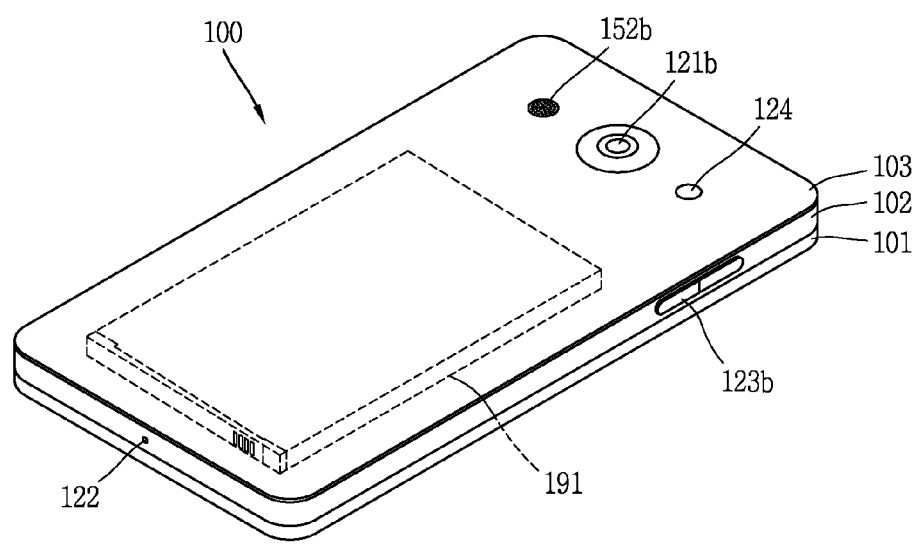
Figure 3A:
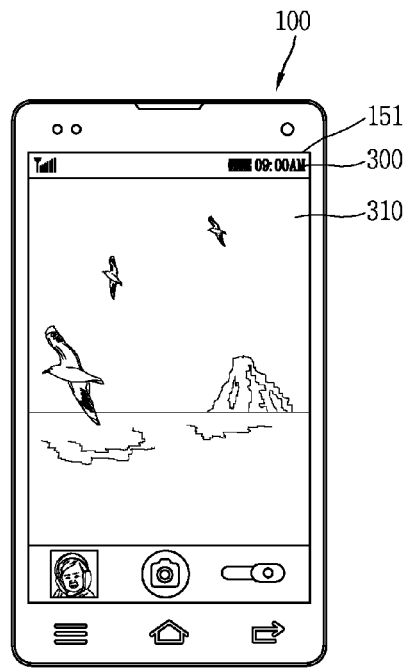
FIG. 3 is a conceptual view illustrating the control method of FIG. 2.
Figure 3B:
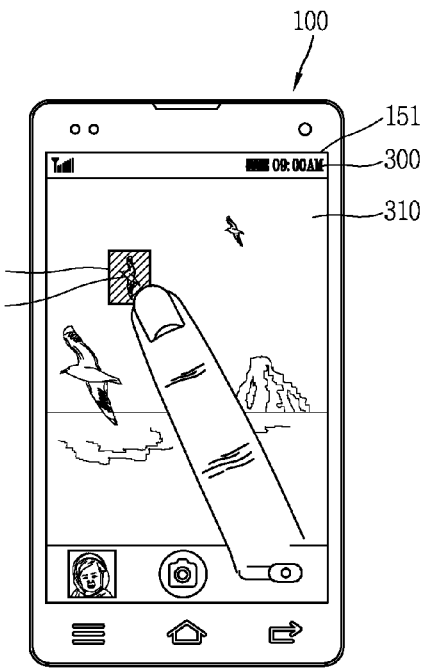
Figure 3D:
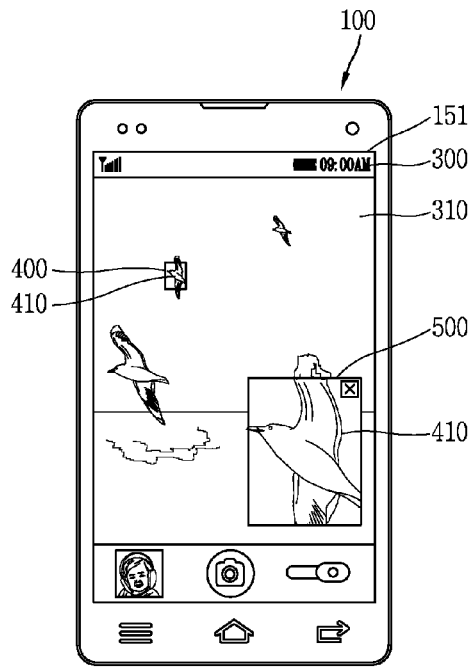
Figure 3C:
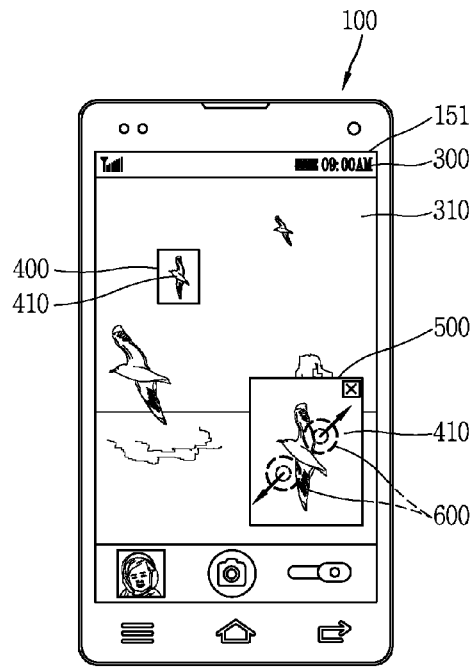

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the mobile terminal according to an exemplary embodiment of the present disclosure that may be able to include one or more of the components described above may execute an image capturing function. The image capturing function may be executed when an icon associated with the image capturing function (or an icon of an application) is selected (or touched). When the image capturing function is executed through the icon, the display unit 151 may be in an ON state.

Meanwhile, in addition to the method of executing the image capturing function by selecting the icon associated with the image capturing function, the image capturing function may also be executed when a key provided in the mobile terminal (for example, at least one of a hardware key and a software key) is selected. In this case, even though the display unit 151 is in an OFF state, the control unit 180 may execute the image capturing function in response to selection of the key provided in the mobile terminal.

In the mobile terminal according to an exemplary embodiment of the present disclosure, as the image capturing function is executed, an image received through the camera may be displayed on the display unit 151. In detail, the mobile terminal may display an image, which is received through the camera, on the display unit 151 in real time. Here, the image received through the camera may be referred to as a "preview image" or an "image".

Execution of the image capturing function may refer to execution of an application driven to capture an image. When the image capturing function is executed, the control unit 180 may activate the camera 121 to be ready for capturing an image. Also, the control unit 180 may output an image input through the activated camera 121 on the display unit 151. Here, in the present disclosure, an image input through the activated camera 121 and output on the display unit 151 is defined as a "preview image". Also, when an image capturing operation is performed on the basis of a user selection, the control unit 180 may store a preview image being output on the display unit 151, in a memory unit.

The mobile terminal according to an exemplary embodiment of the present disclosure may provide an image capturing function for storing an image (a preview image) received through the camera in the memory. Here, the operation of the mobile terminal storing an image received through the camera in the memory may also be expressed as "capturing an image", "obtaining an image", "capturing a preview image", "performing capturing on a preview image", processing an image capture command regarding a preview image", "performing an image capture function on a preview image", and the like. Also, without being restricted to the expressions enumerated above, any other expression may be freely used as long as an image received through the camera is stored in the memory unit.

In an exemplary embodiment of the present disclosure, the mobile terminal may perform an image capturing operation on the basis of a user selection, and such a user selection may be expressed as a "user's control command" or a "control command". Meanwhile, a user selection may be performed in various manners. For example, the user may touch or press a hardware key provided in the mobile terminal or may touch at least one of software keys or visual keys output on the display unit 151 to perform the image capturing operation. That is, when a hardware key associated with the image capturing function is touched or pressed or when at least one of software keys or visual keys is touched, the control unit 180 may determine that a user's control command for performing the image capturing operation has been received. On the basis of such a control command, the control unit 180 may capture an image input through the camera 121. Also, in addition to such examples, the image capturing function may also be performed when a user voice corresponding to a command previously set in a microphone is received, when a particular gesture is applied to the mobile terminal, or when a preset movement is sensed by the mobile terminal.

Meanwhile the mobile terminal according to an exemplary embodiment of the present disclosure may execute various functions on the basis of a touch applied to a region of the display unit 151 in which a preview image is output. The various functions may include a focus adjusting function, an image capturing function, and the like. For example, in a state in which a preview image is output on the display unit 151, when a touch is applied to a portion of a region on which a preview image is output, the control unit 180 may adjust focus centered on the region to which the touch has been applied.

In another example, in a state in which a preview image is output on the display unit 151, when a touch is applied to a portion of a region on which the preview image is output, the control unit 180 may determine that a user's control command for performing an image capturing operation has been received (that is, the touch is determined as the user's control command). That is, on the basis of the touch applied to a region of the display unit 151, the control unit 180 may capture the preview image.

In another example, on the basis of at least one touch applied to a portion of a region on which the preview image is output, the control unit 180 may adjust focus centered on the touched region, and sequentially perform an operation of capturing a focus-adjusted preview image.

Meanwhile, when a preset type of touch 390 is applied to a region 300 in which a preview image 310 is output, the control unit 180 may output a pop-up window 500. In detail, the preset type of touch 390 refers to a touch for selecting one region and may be implemented in various manners. A method of selecting a portion 400 of the region on which the preview image 310 is output will be described in detail with reference to FIGS. 4A through 4D.

When the portion 400 of the region 300 in which the preview image 310 is output is selected, the control unit 180 may output a pop-up window 500. The pop-up window 500 may include a preview image 410 corresponding to the portion 400. In other words, in a state in which the preview image 310 is output, when the portion 400 of the region 300 in which the preview image is output is selected, the control unit 180 may output the pop-up window 500 including the preview image 410 corresponding to the portion 400.

In a state in which the preview image 310 is output, the pop-up window 500 may be output in an overlapping manner in the region 300 in which the preview image is output. That is, in a state in which outputting of the preview image 310 is maintained, the pop-up window 500 may be output.

The preview image 410 corresponding to the selected portion 400 of the region 300 in which the preview image is output may be included in the pop-up window 500. In detail, the control unit 180 may output the preview image 410 corresponding to the selected portion 400 of the region on which the preview image is output, on the pop-up window 500. Here, the control unit 180 may set the pop-up window 500 to be larger than the portion 400 such that the preview image 410 corresponding to the selected portion 400 may be magnified to be output. That is, in an exemplary embodiment of the present disclosure, in a state in which the preview image 410 is maintained to be output, at least a portion of the preview image 410 may be magnified to be displayed using the pop-up window.

The position of the portion 400 may be fixed to a selected position until when a separate user request is made. In detail, even though the mobile terminal is moved by an external force or even though a screen (or screen information) included in (output on) the preview image 310 is changed according to a movement of a subject, the position of the portion 400 may be fixed. Here, with respect to the changed screen of the preview image 310, the preview image 410 corresponding to the portion 400 may be output on the pop-up window 500. That is, in response to the preview image 310 changed in real time, the preview image 410 corresponding to a portion of the changed preview image 310 may be output on the pop-up window 500.

In another example, relying on a movement of a graphic object included in the preview image 310, the control unit 180 may execute a tracking function to change a position of the portion 400.

Also, in a state in which the pop-up window 500 is output, when a preset type of touch is applied to the pop-up window 500, the control unit 180 may magnify or reduce the preview image 410 corresponding to the portion 400. Also, in a state in which the pop-up window 500 is output, the control unit 180 may vary a size of the portion 400 to magnify or reduce the preview image 410 corresponding to the portion 400.

Here, magnifying or reducing the preview image 410 corresponding to the portion 400 may refer to zooming in (magnifying) the preview image 410 or zooming out (reducing) the preview image 410 and magnifying or reducing the size of the preview image 410 itself.

As described above, in an exemplary embodiment of the present disclosure, the novel user interface for magnifying or reducing only a user desired portion, rather than magnifying or reducing the preview image 410, while maintaining output of the preview image, in executing the image capturing function, may be provided.

Hereinafter, a method of magnifying at least a portion of the preview image using a pop-up window in a state in which the preview image is output on a display unit according to execution of the image capturing function will be described in detail.

FIG. 2 is a flow chart illustrating a control method according to an exemplary embodiment of the present disclosure, and FIG. 3 is a conceptual view illustrating the control method of FIG. 2.

To begin with, referring to FIG. 2, as an image capturing function is executed according to a user request, a preview image 310 received through a camera is output in step S210. When the image capturing function is executed, the display unit 151 may be in an ON state. The preview image 310 may be output in an output region of the display unit 151. As illustrated in (a) of FIG. 3, the preview image 310 may be output in an output region 300 of the display unit 151. Hereinafter, the region 300 in which the preview image 310 is output may refer to the output region 300 of the display unit 151.

Thereafter, in the state in which the preview image 310 is output, when a portion 400 of the region on which the preview image 310 is output is selected, a pop-up window 500 including the preview image 410 corresponding to the portion 400 may be output in step S220.

On the basis of a preset type of touch applied to the region 310 in which the preview image 310 is output, the control unit 180 may select the portion 400. As the portion 400 is selected, the control unit 180 may output the pop-up window 500 including the preview image 410 corresponding to the portion 400.

Hereinafter, a method of selecting a portion and a method of outputting a pop-up window including a preview corresponding to the portion will be described with reference to FIGS. 4A through 4D.

FIGS. 4A, 4B, 4C, and 4D are conceptual views illustrating a method of outputting a preview image corresponding to a portion of a region on which the preview image is output, on a pop-up window.

In a state in which the preview image 310 is output, the control unit 180 may select the portion 400 on the basis of various types of touches applied to the region 300 in which the preview image 310 is output. The various types of touches may be a preset type of touch 390 for selecting the portion 400, and the preset type of touch 390 may include any one of a short touch (or a tap), a long touch, a multi-touch, a drag touch, a flick touch, a pinch-in touch, a pinch-out touch, a swipe touch, and a hovering touch.

Figure 4A:
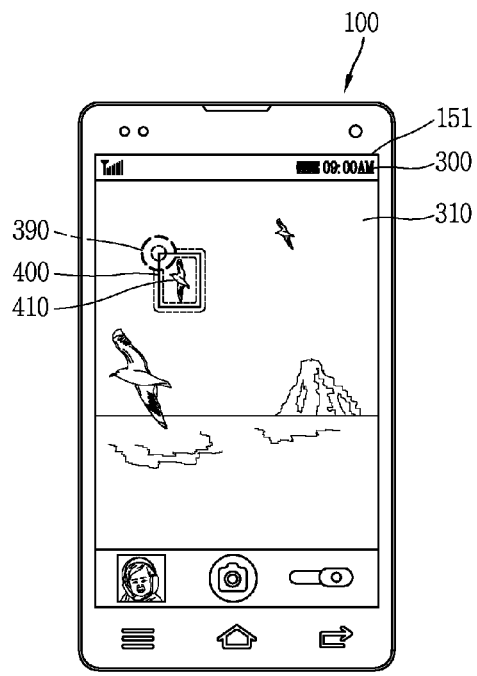
FIGS. 4A, 4B, 4C, and 4D are conceptual views illustrating a method of outputting a preview image corresponding to a portion of a region on which the preview image is output, on a pop-up window.
Figure 4A:
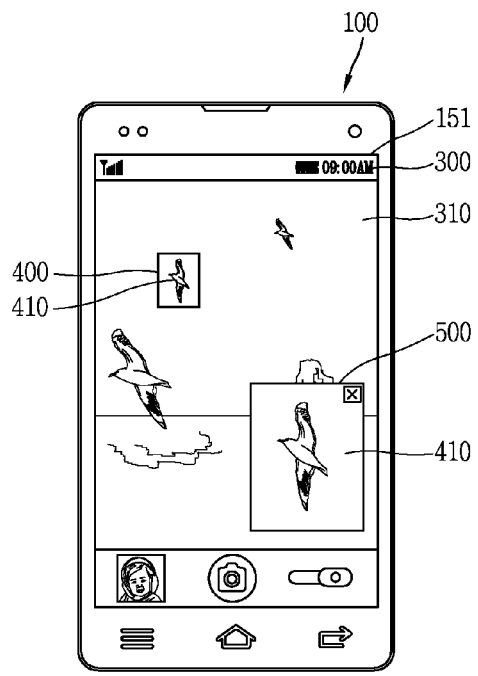

For example, as illustrated in (a) of FIG. 4A, the preset type of touch 390 applied to the region on which the preview image is output may be a drag touch. Here, as illustrated in (b) of FIG. 4A, on the basis of a closed curve formed by a trace of the drag touch (or on the basis of formation of a closed curve by a trace of the drag touch), the control unit 180 may set a region corresponding to the closed curve, as the portion 400.

Figure 4B:
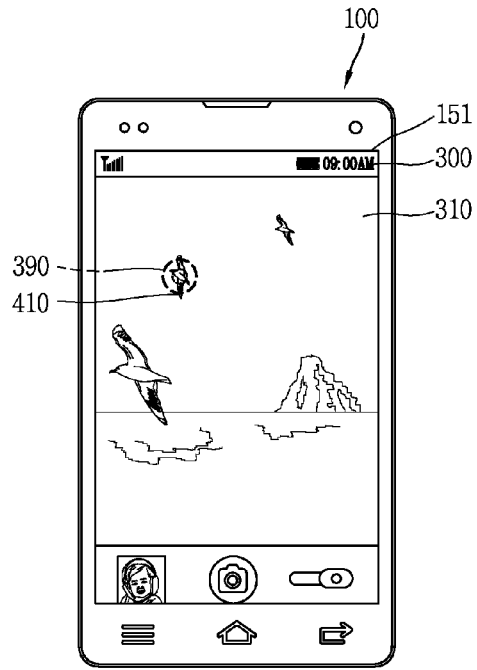
Figure 4B:
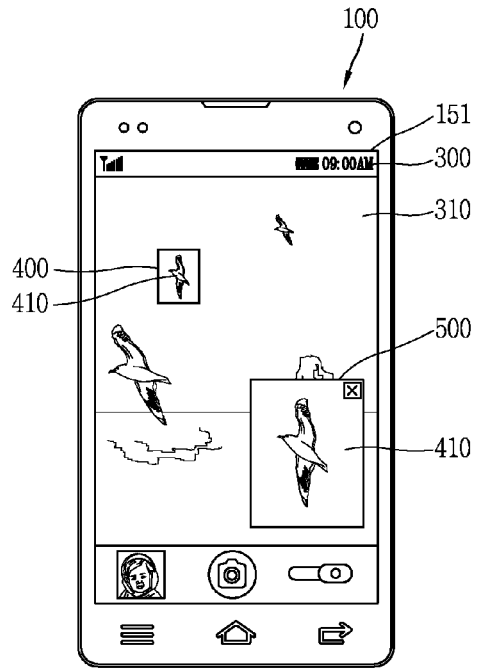

In another example, as illustrated in (a) of FIG. 4B, the preset type of touch 390 applied to the region on which the preview image is output may be a touch applied to a point. The touch applied to a point may be at least one of a short touch, a long touch, and double short touches. Here, as illustrated in (b) of FIG. 4B, the control unit 180 may set the portion 400 having a reference size centered on the point to which the touch 390 (for example, a long touch) has been applied.

Figure 4C:
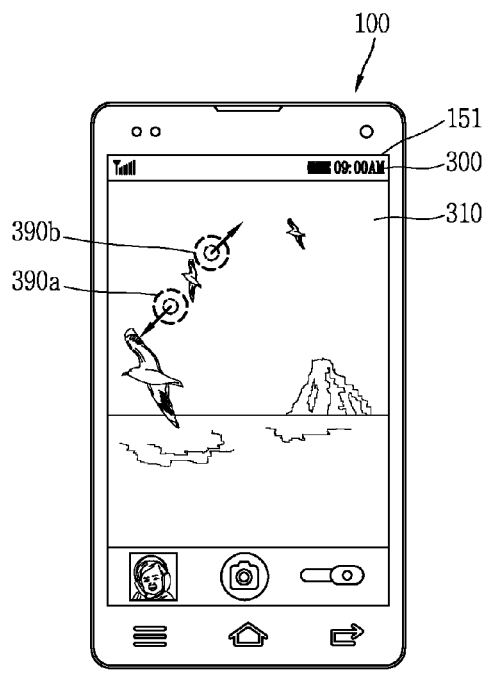
Figure 4C:
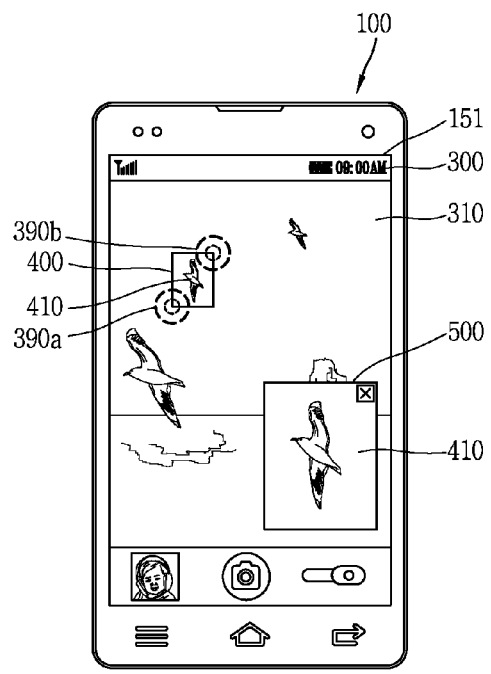
Figure 4D:
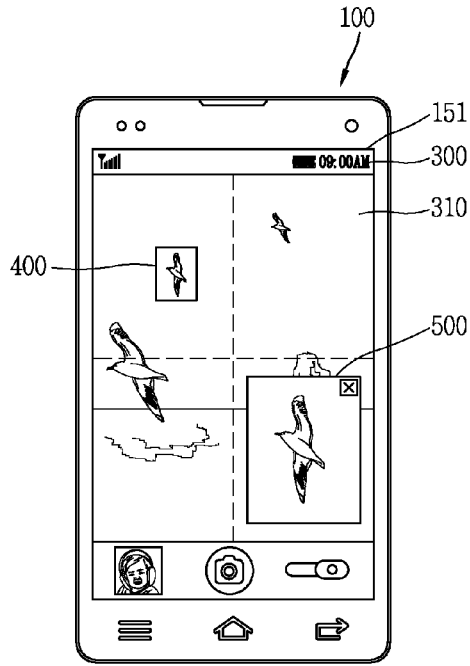
Figure 4D:
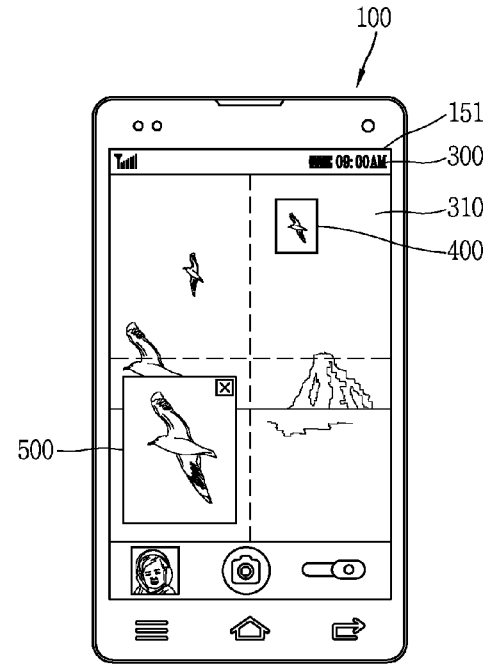

In another example, as illustrated in (a) of FIG. 4C, pinch-out touches 390a and 390b may be applied to the region on which the preview image is output. In this case, as illustrated in (b) of FIG. 4C, the control unit 180 may set a portion 400 with respect to the points 390a and 390b to which the pinch-out touches have been applied. The points 390a and 390b to which the pinch-out touches have been applied may be points to which the pinch-out touch has been started or points in which the pinch-out touch has been terminated.

In a state in which the preview image 310 is output, when the preset type of touch 390 is applied to the preview image 310, the control unit 180 may select the portion 400. Thereafter, as illustrated in FIGS. 4A through 4C, on the basis of the selection of the portion 400, the control unit 180 may output a pop-up window 500 including the preview image 410 corresponding to the selected portion 400.

Here, a size of the pop-up window 500 may be larger than a size of the portion 400 such that the preview image 310 corresponding to the portion 400 is magnified so as to be displayed.

Meanwhile, a position in which the pop-up window 500 is output may be determined on the basis of a position of the portion 400. For example, when it is assumed that the region 300 in which the preview image is output is divided into four parts (four quadrants), a position where the pop-up window 500 is output may be in a quadrant positioned in a diagonal line direction of the quadrant in which the portion 400 is positioned. As illustrated in (a) of FIG. 4D, when the portion 400 is positioned in the second quadrant, the pop-up window 500 may be output on the fourth quadrant. Also, as illustrated in (b) of FIG. 4D, when the portion 400 is positioned in the first quadrant, the pop-up window 500 may be output on the third quadrant.

Referring back to FIG. 3, when the portion 400 of the region 310 in which the preview image is output is selected as illustrated in (b) of FIG. 3, the control unit 180 may output the pop-up window 500 including the preview image 410 corresponding to the portion 400 as illustrated in (c) of FIG. 3.

Thereafter, when a preset type of touch 600 is applied to the pop-up window 500, the preview image corresponding to the portion 400 is magnified or reduced in step S230. The preset type of touch 600 applied to the pop-up window 500 may include at least one of a pinch-in touch or a pinch-out touch. For example, when the pinch-out touch 600 is applied to the pop-up window 500 as illustrated in (c) of FIG. 3, the control unit 180 may magnify or reduce the preview image 410 corresponding to the portion 400 in the pop-up window 500 as illustrated in (d) of FIG. 3. In detail, when the preset type of touch 600 is applied to the pop-up window 500, the control unit 180 may control the display unit 151 to magnify or reduce at least a portion of the preview image 410 corresponding to the portion output on the pop-up window 500.

Magnifying or reducing the preview image 410 corresponding to the portion 400 in the pop-up window 500 may be performed according to varying a size of the portion 400 on the basis of the preset type of touch 600 applied to the pop-up window 500. The preview image 410 corresponding to the portion 400 is output on the pop-up window 500. That is, on the basis of the preset type of touch 600 applied to the pop-up window 500, the control unit 180 may magnify or reduce the size of the portion 400. Thereafter, the control unit 180 may output the preview image 410 corresponding to the portion 400 having a changed size, on the pop-up window 500, thereby magnifying or reducing the preview image 410 corresponding to the portion 400 output on the pop-up window 500.

Hereinafter, a method of magnifying or reducing a preview image corresponding to a portion of a region on which a previous image is output, in a pop-up window, on the basis of a preset type of touch applied to the pop-up window will be described in detail with reference to the accompanying drawings.

FIGS. 5A, 5B, 5C, 5D, 5E, 6A, 6B, 6C, 6D, and 7 are conceptual views illustrating a method of magnifying or reducing a preview image corresponding to a portion of a region on which a preview image is output, in a pop-up window.

First, a method of magnifying a preview image 410 corresponding to a portion of an output region will be described in detail with reference to FIGS. 5A through 5E.

When a preset type of touch is applied to the pop-up window 500, the control unit 180 may reduce or magnify a size of the portion 400 to magnify (zoom in) or reduce (zoom out) the preview image 410 corresponding to the portion 400, in the pop-up window 500.

That is, when the preset type of touch 600 applied to the pop-up window 500 is a pinch-out touch, the control unit 180 may reduce the size of the portion 400. The image 410 output on the pop-up window 500 may be magnified (zoom in) as the size of the portion 400 is reduced.

Here, the control unit 180 may magnify or reduce the preview image corresponding to the portion 400, centered on a point to which the preset type of touch 600 is applied. In detail, the control unit 180 may change the size of the portion 400 such that the preview image 410 corresponding to the portion 400 output on the pop-up window 500 is magnified or reduced with respect to the point to which the preset type of touch 600 has been applied.

Figure 5A:
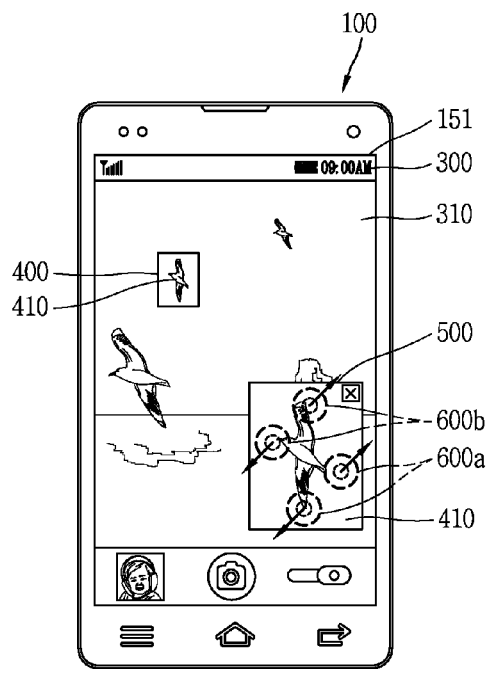
FIGS. 5A, 5B, 5C, 5D, 5E, 6A, 6B, 6C, 6D, and 7 are conceptual views illustrating a method of magnifying or reducing a preview image corresponding to a portion of a region on which a preview image is output, in a pop-up window.
Figure 5A:
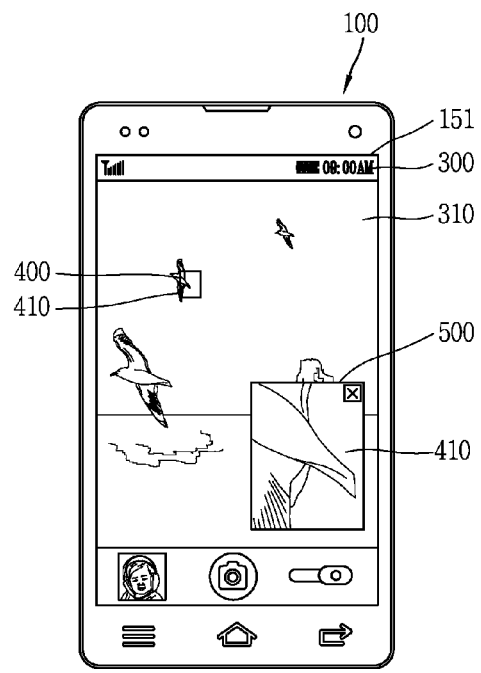
Figure 5A:
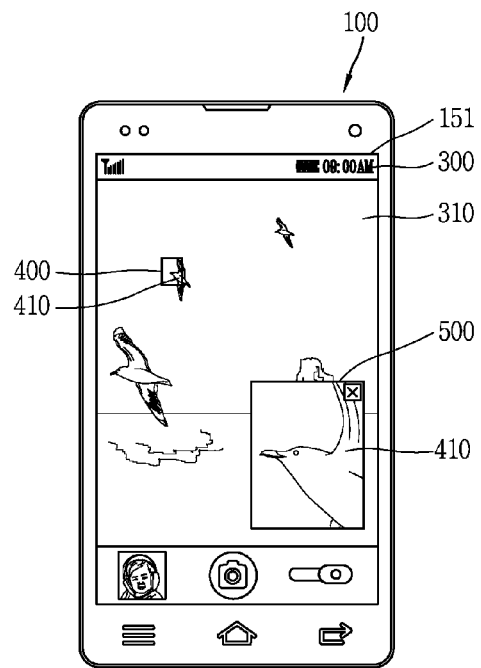

For example, as illustrated in (a) of FIG. 5A, in a state in which the pop-up window 500 is output, a pinch-out touch may be applied to a point corresponding to 600a in the pop-up point 500. Here, as illustrated in (b) of FIG. 5A, the controller unit 180 may reduce the size of the portion 400 such that the image 410 corresponding to the portion 400 is magnified centered on the point corresponding to 600a.

In another example, when a pinch-out touch is applied to a point corresponding to 600b, as illustrated in (c) of FIG. 5A, the control unit 180 may reduce the size of the portion 400 such that the image 410 corresponding to the portion 400 is magnified centered the point corresponding to 600b.

Meanwhile, the control unit 180 may magnify the preview image 410 corresponding to the portion 400 included in the pop-up window 500 on the basis of various types of touches applied to the pop-up window 500.

The various types of touches 600 may include a long touch, double short touches, and the like. As illustrated in (a) of FIG. 5B, when at least one of a long touch and double short touches is applied to the pop-up window 500, the control unit 180 may reduce the size of the portion 400 such that the preview image 410 corresponding to the portion 400 output on the pop-up window 500 may be magnified.

Meanwhile, on the basis of a preset type of touch applied to the region 300 in which the preview image is output, rather than to the pop-up window 500, the control unit 180 may magnify the preview image 410 corresponding to the portion output on the pop-up window 500. The preset type of touch applied to the region 300 in which the preview image 410 is output may be a touch applied to the portion 400.

An indicator indicating the portion 400 may be displayed on the display unit 151. The indicator may be formed to correspond to the edge of the portion 400.

A size of the portion 400 may be changed on the basis of a drag touch starting from the indicator. As illustrated in (a) of FIG. 5C, the size of the portion 400 may be changed on the basis of the drag touch applied to start from the indicator. Here, as illustrated in (b) of FIG. 5C, the image 410 corresponding to the portion 400 changed in size may be displayed in the pop-up window 500.

That is, by changing the size of the portion 400 on the basis of a touch applied to the region on which the preview image is output, as well as a preset type of touch applied to the pop-up window, the control unit 180 may magnify or reduce the preview image 410 corresponding to the portion 400 output on the pop-up window 500.

Meanwhile, in a state of maintaining the size of the pop-up window, the control unit 180 may change a size of the portion 400. That is, in an exemplary embodiment of the present disclosure, the preview image 410 corresponding to the portion 400 may be magnified (zoom in) or reduced (zoom out) in the pop-up window 500 by changing the size of the portion 400 in the state of maintaining the size of the pop-up window 500.

Figure 5B:
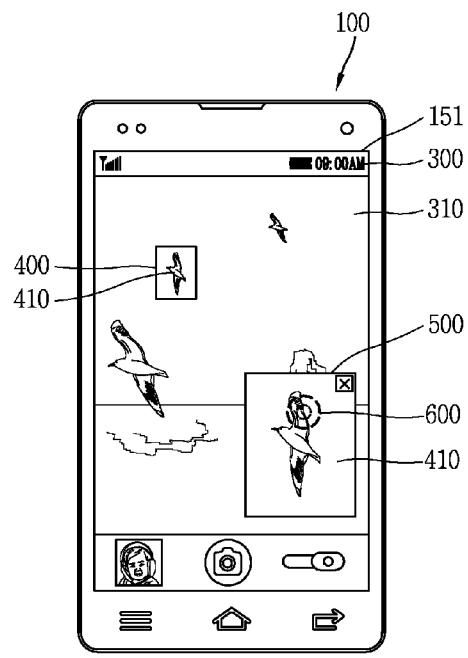
Figure 5B:
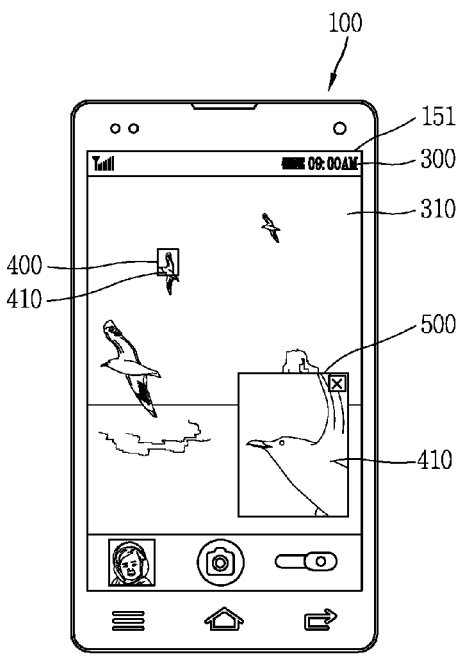
Figure 5C:
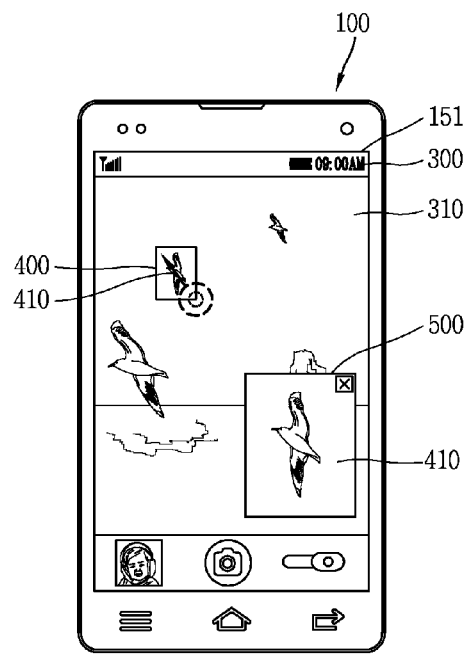
Figure 5C:
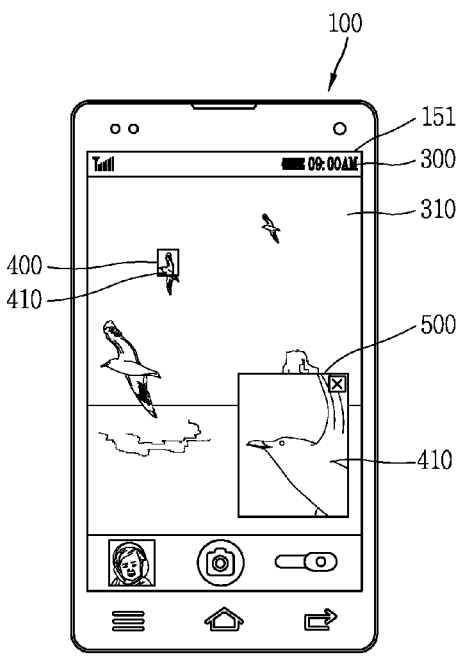

In FIGS. 5A through 5C, the method of magnifying (zooming in) the preview image 410 corresponding to the portion 400 in the pop-up window 500 by changing a size of the portion 400 has been described. Meanwhile, the control unit 180 may change a size of the of the preview image 410 itself corresponding to the portion 400 output on the pop-up window 500 by changing a size of the pop-up window 500.

Figure 5D:
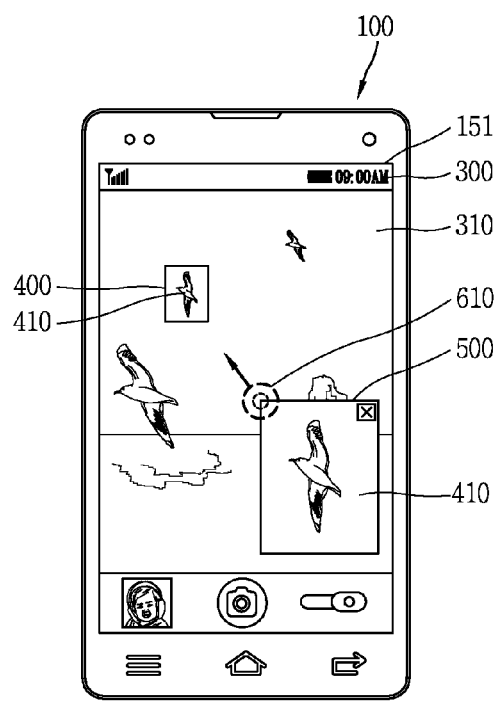
Figure 5D:
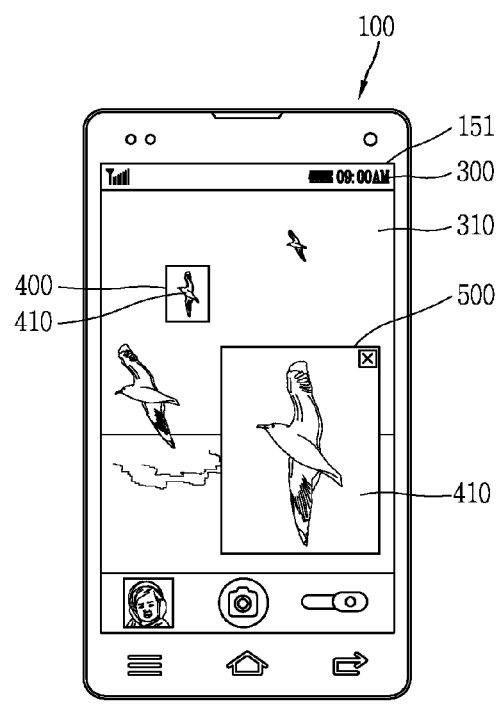

For example, as illustrated in (a) of FIG. 5D, when a drag touch starting from the edge of the pop-up window 500 is applied, the control unit 180 may change a size of the pop-up window 500. Accordingly, the preview image 410 itself corresponding to the portion 400 output on the pop-up window 500 may be magnified (scaled up).

Figure 5E:
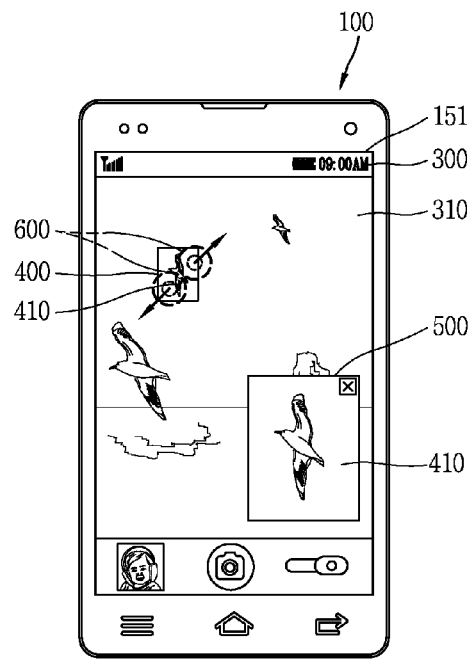
Figure 5E:
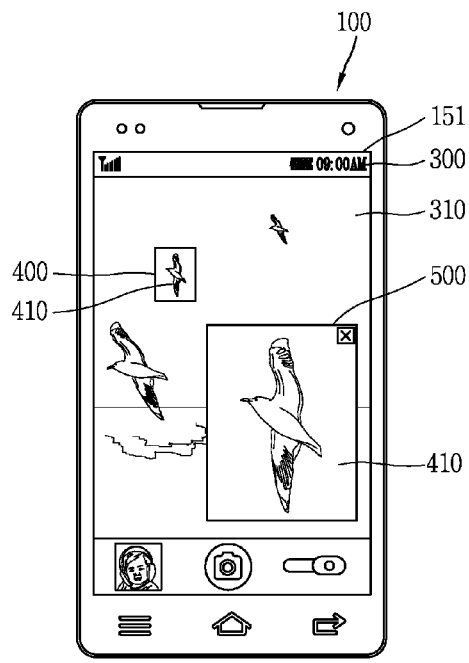
Figure 5E:
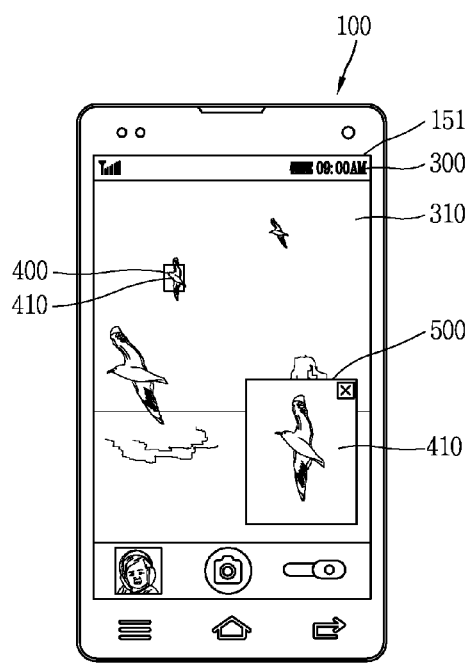

In another example, on the basis of a pinch-out touch 600 applied in the portion 400 as illustrated in (a) of FIG. 5E, the control unit 180 may magnify a size of the pop-up window 500 as illustrated in (b) of FIG. 5E. Meanwhile, when the pinch-out touch 600 is applied in the portion 400, the control unit may reduce the size of the portion 400 in a state in which a size of the pop-up window 500 is maintained as illustrated in (c) of FIG. 5E. Here, the size of the portion 400 may be reduced centered on the point to which the pinch-out touch 600 is applied.

By changing the size of the pop-up window 500 itself or by changing the size of the portion 400, the control unit 180 may magnify or reduce the preview image 410 corresponding to the portion 400 included in the pop-up window 500.

Hereinafter, a method of reducing the preview image 410 corresponding to a portion of the output region will be described with reference to FIGS. 6A and 6B.

When a preset type of touch is applied to the pop-up window 500, the control unit 180 may reduce or magnify a size of the portion 400 to magnify (zoom in) or reduce (zoom out) the preview image 410 corresponding to the portion 400 in the pop-up window 500.

That is, when the preset type of touch 600 applied to the pop-up window 500 is a pinch-in touch, the control unit 180 may magnify the size of the portion 400. The image 410 output on the pop-up window 500 may be reduced (zoom out) as the size of the portion 400 is magnified.

Figure 6A:
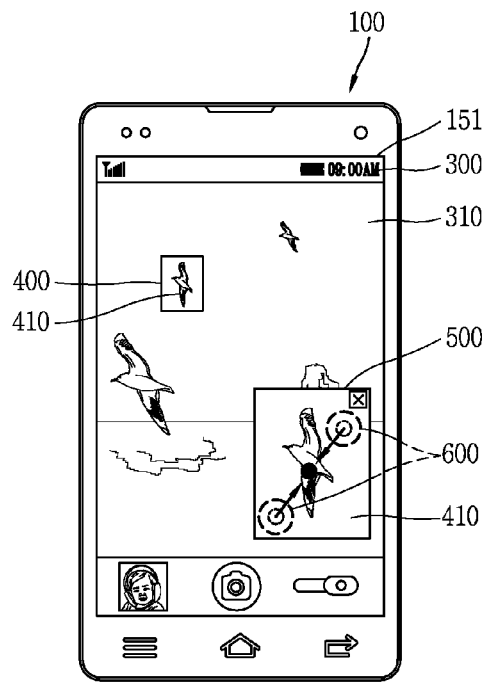
Figure 6A:
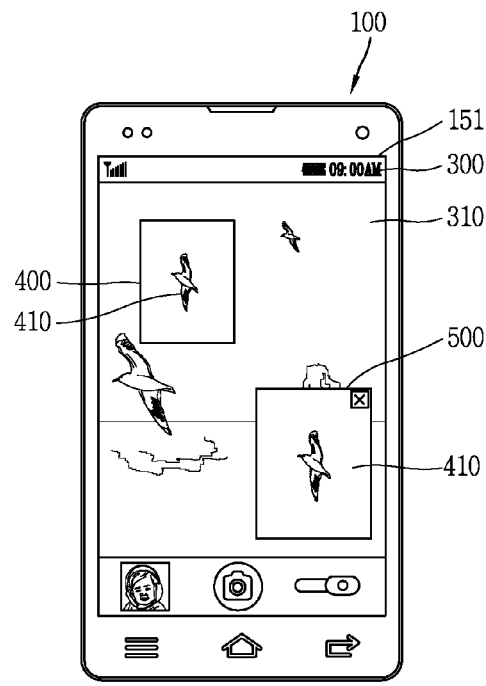

For example, as illustrated in (a) of FIG. 6A, in a state in which the pop-up window 500 is output, a pinch-in touch 600 may be applied to the pop-up window 500. Here, as illustrated in (b) of FIG. 6A, the control unit 180 may magnify the size of the portion 400 such that the image 410 corresponding to the portion 400 in the pop-up window 500 is reduced (zoom out).

In this case, the control unit 180 may magnify or reduce the preview image 410 corresponding to the portion 400, centered on the point to which the preset type of touch 600 has been applied. In detail, the control unit 180 may change the size of the portion 400 such that preview image 410 corresponding to the portion 400 output on the pop-up window 500 is magnified or reduced, centered on a point to which the preset type of touch 600 has been applied.

Meanwhile, the control unit 180 may reduce the preview image 410 corresponding to the portion 400 included in the pop-up window 500 on the basis of various types of touches applied to the pop-up window 500.

The various types of touches 600 may include a long touch, double short touches, and the like. As illustrated in (a) of FIG. 6B, when at least one of a long touch and double short touches is applied to the pop-up window 500, the control unit 180 may magnify 400a the size of a portion 400b such that the preview image 410 corresponding to the portion 400b output on the pop-up window is reduced. Thereafter, as illustrated in (b) of FIG. 6B, the preview image 410 corresponding to the portion 400 may be output on the pop-up window 500.

Meanwhile, on the basis of a preset type of touch applied to the region 300 in which the preview image is output, rather than to the pop-up window 500, the control unit 180 may reduce the preview image 410 corresponding to the portion output on the pop-up window 500. The preset type of touch applied to the region 300 in which the preview image is output may be a touch applied to the portion 400.

An indicator indicating the portion 400 may be displayed on the display unit 151. The indicator may be formed to correspond to the edge of the portion 400.

A size of the portion 400 may be changed on the basis of a drag touch 610 starting from the indicator. As illustrated in (a) of FIG. 6C, the size of the portion 400 may be changed on the basis of the drag touch 610 applied to start from the indicator. Here, as illustrated in (b) of FIG. 6C, the image 410 corresponding to the portion 400 changed in size may be displayed in the pop-up window 500.

That is, by changing the size of the portion 400 on the basis of a touch applied to the region on which the preview image is output, as well as a preset type of touch applied to the pop-up window, the control unit 180 may magnify or reduce the preview image 410 corresponding to the portion 400 output on the pop-up window 500.

Meanwhile, in a state of maintaining the size of the pop-up window, the control unit 180 may change a size of the portion 400. That is, in an exemplary embodiment of the present disclosure, the preview image 410 corresponding to the portion 400 may be magnified (zoom in) or reduced (zoom out) in the pop-up window 500 by changing the size of the portion 400 in the state of maintaining the size of the pop-up window 500.

Figure 6B:
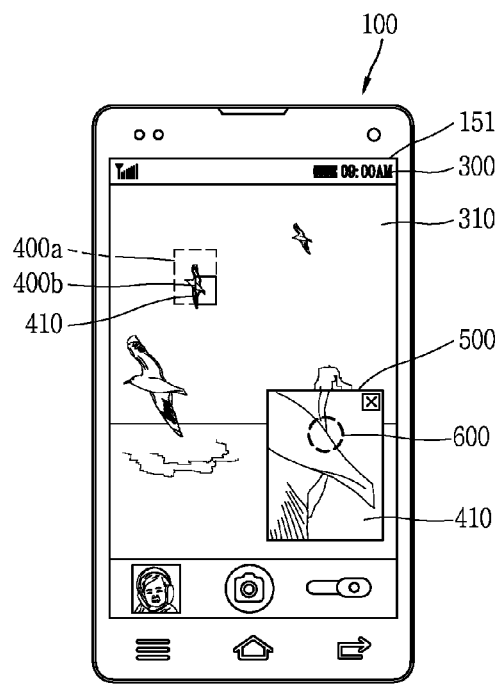
Figure 6B:
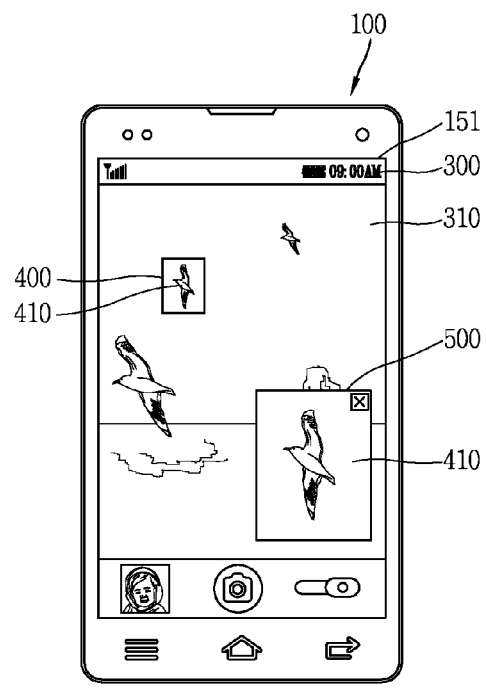
Figure 6C:
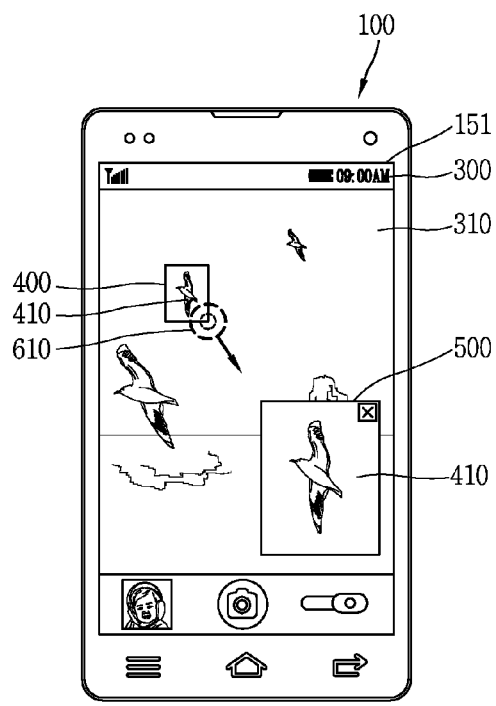
Figure 6C:
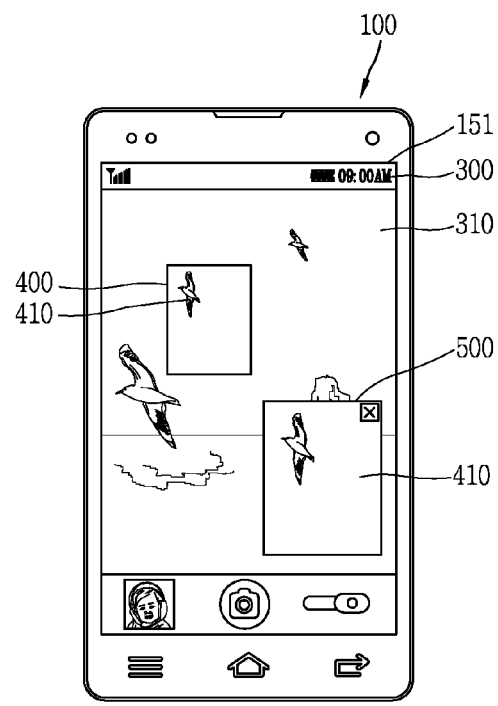

In FIGS. 6A through 6C, the method of reducing (zooming out) the preview image 410 corresponding to the portion 400 in the pop-up window 500 by changing a size of the portion 400 has been described. Meanwhile, the control unit 180 may change a size of the of the preview image 410 itself corresponding to the portion 400 output on the pop-up window 500 by changing a size of the pop-up window 500.

For example, although not shown, when a drag touch starting from the edge of the pop-up window 500 is applied, the control unit 180 may change a size of the pop-up window 500. Accordingly, the preview image 410 itself corresponding to the portion 400 output on the pop-up window 500 may be reduced (scaled down).

Figure 6D:
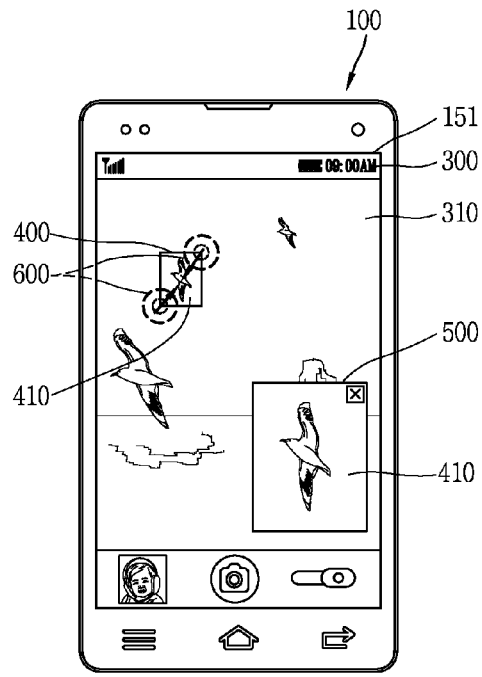
Figure 6D:
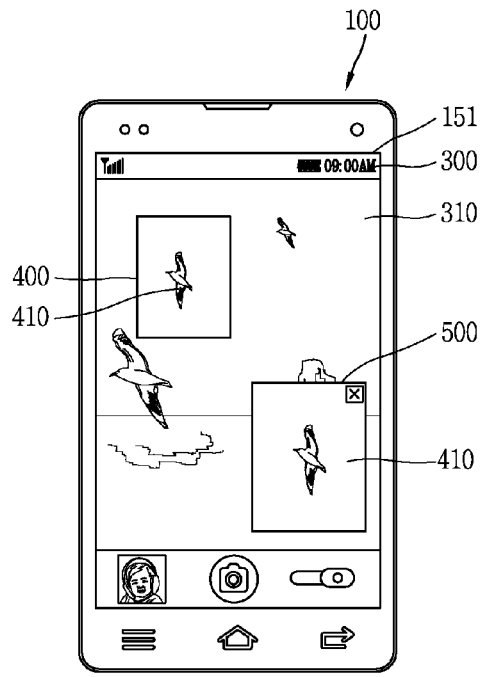
Figure 6D:
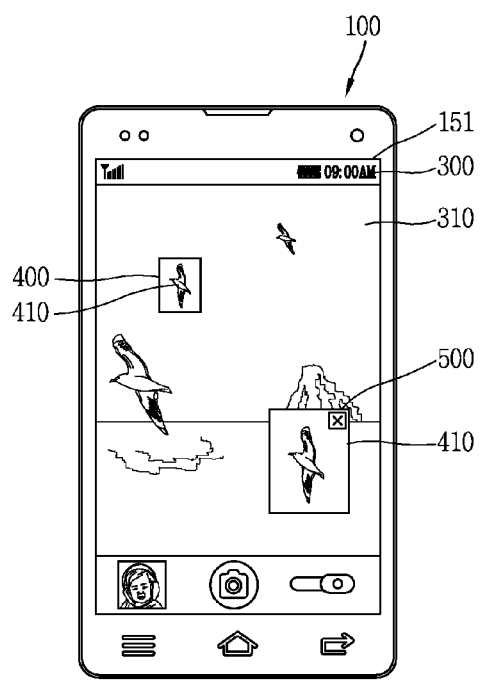

In another example, on the basis of a pinch-out touch 600 applied in the portion 400 as illustrated in (a) of FIG. 6D, the control unit 180 may magnify a size of the pop-up window 500 in a state of maintaining a size of the pop-up window 500 as illustrated in (b) of FIG. 6D. Here, the size of the portion 400 may be magnified centered on the point to which the pinch-out touch 600 is applied. Meanwhile, when the pinch-in touch is applied in the portion 400, the control unit 180 may reduce the size of the pop-up window 500 as illustrated in (c) of FIG. 6D.

In FIGS. 5A through 6D, the method of magnifying or reducing the preview image 410 corresponding to the portion 400 in the pop-up window 500 by changing a size of at least one the portion 400 and the pop-up window 500 has been described.

Figure 7A:
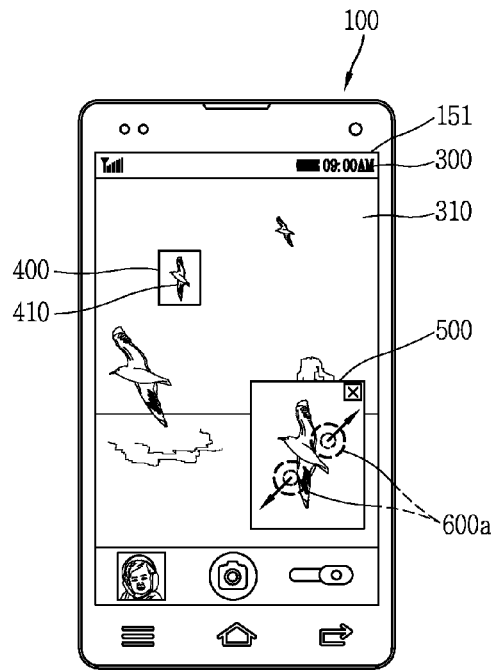
Figure 7B:
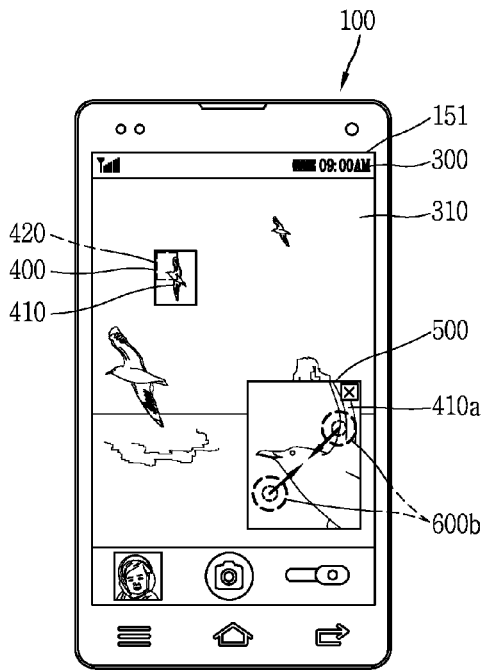
Figure 7C:
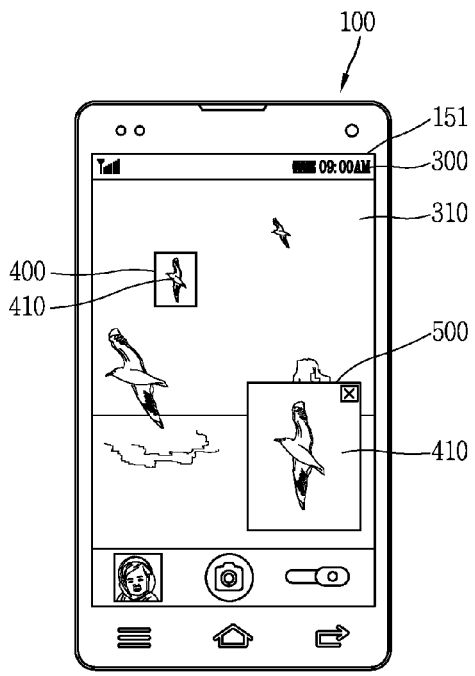

Meanwhile, as illustrated in FIG. 7, the control unit 180 may magnify or reduce the preview image 410 corresponding to the portion 400 included in the pop-up window 500 in a state in which the sizes of the portion 400 and the pop-up window 500 are maintained.

For example, when a pinch-out touch 600a is applied in the pop-up window 500 as illustrated in (a) of FIG. 7, the control unit 180 may magnify the preview image 410 corresponding to the portion 400 such that at least a portion of the preview image 410 corresponding to the portion 400 can be displayed as illustrated in (b) of FIG. 7. Here, as described above, the control unit 180 may magnify or reduce the preview image 410 corresponding to the portion 400, centered on the point to which the touch has been applied in the pop-up window.

Meanwhile, when the preview image 410 corresponding to the portion 400 included in the pop-up window 500 is magnified in a state in which the sizes of the pop-up window and the portion 400 are maintained, a guide 420 indicating the area included in the pop-up window 500 may be displayed in the portion 400.

Thereafter, when a pinch-in touch 600b is applied in the pop-up window 500 in a state in which the preview image 410 corresponding to the portion 400 is magnified to be output on the pop-up window 500, the control unit 180 may reduce the preview image 410 corresponding to the portion 400 output on the pop-up window 500 as illustrated in (c) of FIG. 7. Here, when the image 410 output on the pop-up window 500 is the same as the preview image 410 corresponding to the portion 400, the guide 420 may disappear.

Meanwhile, in an exemplary embodiment of the present disclosure, a position of the portion 4000 may be changed, a pop-up window may be moved, or a pop-up window may disappear on the basis of a user request.

Figure 8A:
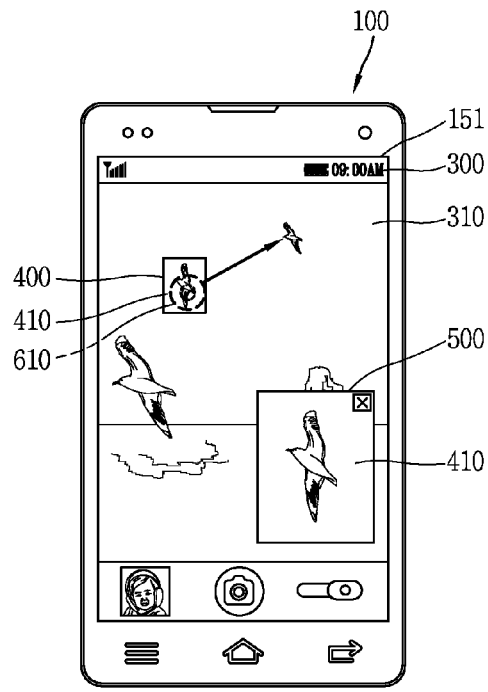
FIGS. 8A, 8B, and 8C are conceptual views illustrating a method of moving a portion of a region on which a preview image is output, moving a pop-up window, or making a pop-up window disappear.
Figure 8A:
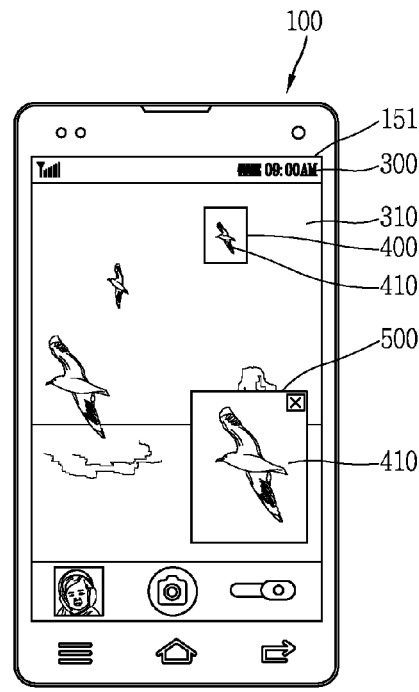
Figure 8B:
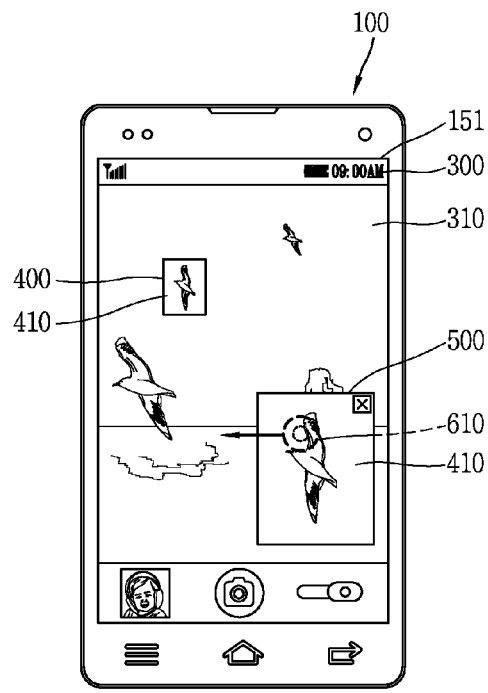
Figure 8B:
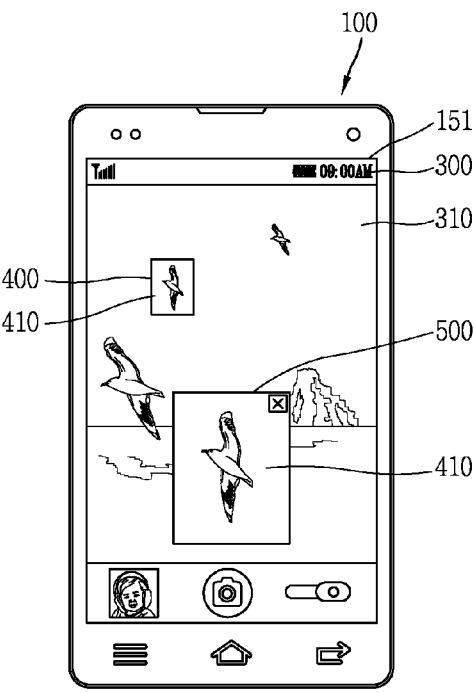
Figure 8C:
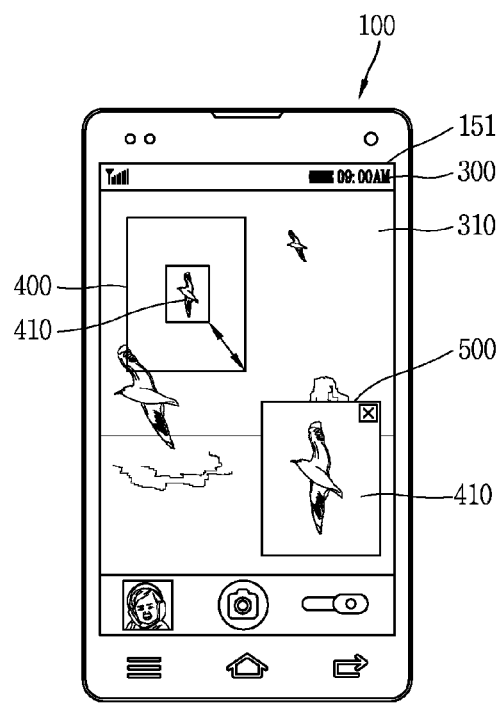
Figure 8C:
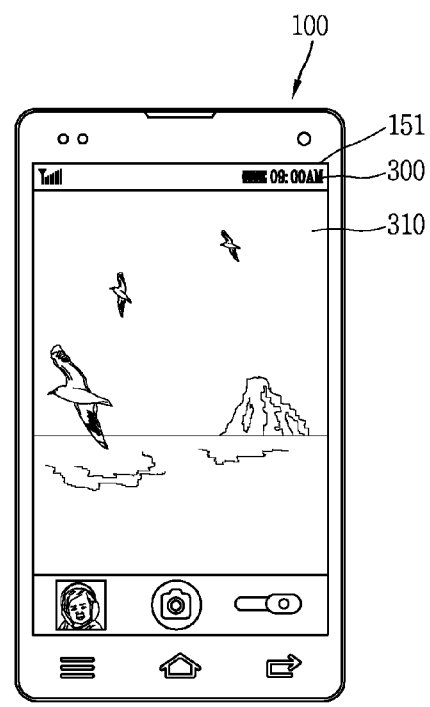

FIGS. 8A, 8B, and 8C are conceptual views illustrating a method of moving a portion of a region on which a preview image is output, moving a pop-up window, or making a pop-up window disappear.

As illustrated in (a) of FIG. 8A, the control unit 180 may move the portion 400 on the basis of a drag touch 610 starting from the portion 400 in a state in which the pop-up window 500 is output. Thereafter, as illustrated in (b) of FIG. 8A, the preview image 410 corresponding to the moved portion 400 may be output on the pop-up window 500.

Meanwhile, as illustrated in (a) of FIG. 8B, the control unit 180 may change an output position of the pop-up window 500 on the basis of a drag touch 610 starting from the pop-up window 500. Here, even though the output position of the pop-up window 500 is changed, the position of the portion 400 may be maintained.

Meanwhile, in a case where the size of the portion 400 is equal to or greater than that of the pop-up window 500, the control unit 180 may control the display unit 151 to make the pop-up window 500 disappear. That is, as described above with reference to FIGS. 5A through 6E, when a preset type of touch 500 is applied to the pop-up window 500 or when the size of the portion 400 is changed by a drag touch starting from the edge (indicator) of the portion 400 so the size of the portion 400 is equal to or greater than that of the pop-up window 500, the pop-up window 500 may disappear. Also, when the size of the pop-up window 500 is changed on the basis of a drag touch starting from the edge of the pop-up window 500 so the size of the portion 4000 is equal to or greater than that of the pop-up window 500, the pop-up window 500 may disappear.

As described above, according to an exemplary embodiment of the present disclosure, the user interface corresponding to the novel zoom-in or zoom-out function in the image capturing function may be provided. Also, in an exemplary embodiment of the present disclosure, a particular portion may be magnified and output, while maintaining outputting of a preview image is maintained. Thus, the present disclosure may satisfy user demand for magnifying only a particular portion of a preview image and outputting the magnified portion.

Hereinafter, a method of executing an image capturing function in a state in which a pop-up window is output will be described in detail.

Figure 9A:
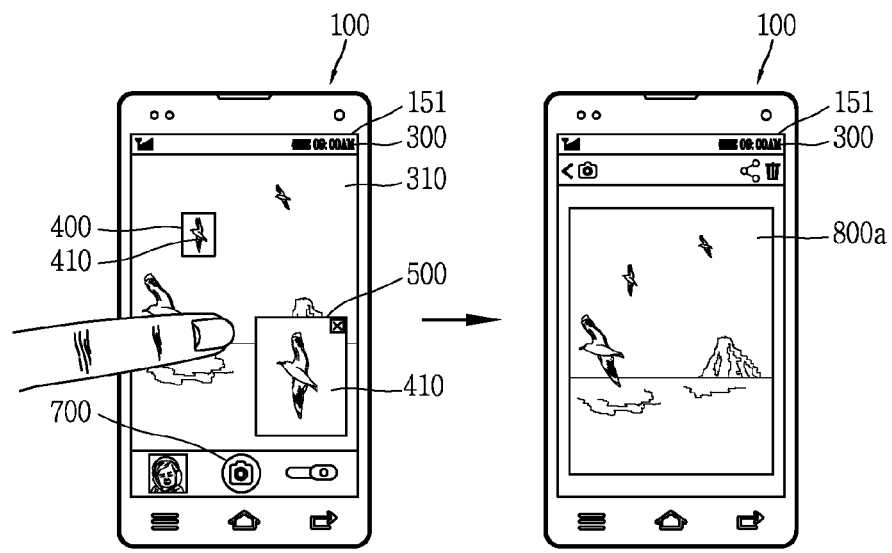
FIGS. 9A, 9B, and 9C are conceptual views illustrating a method of executing an image capturing function in a state in which a pop-up window is output.
Figure 9A:
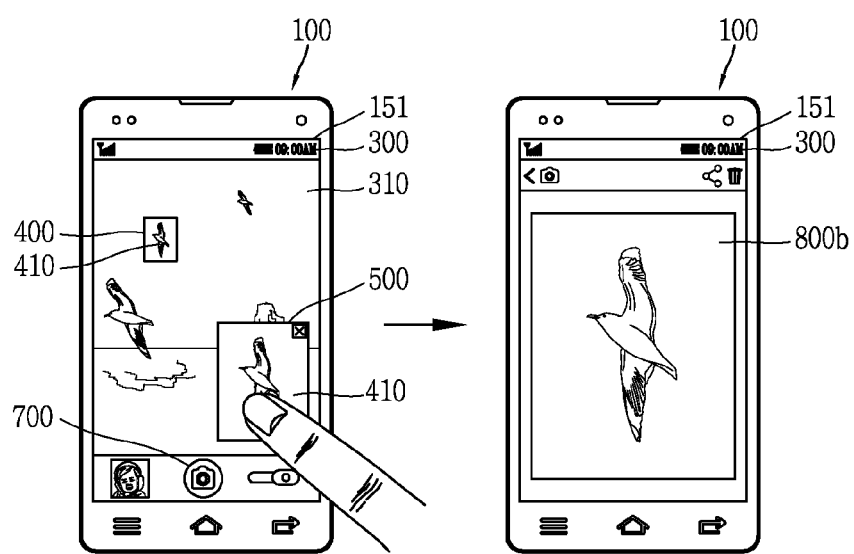
Figure 9A:
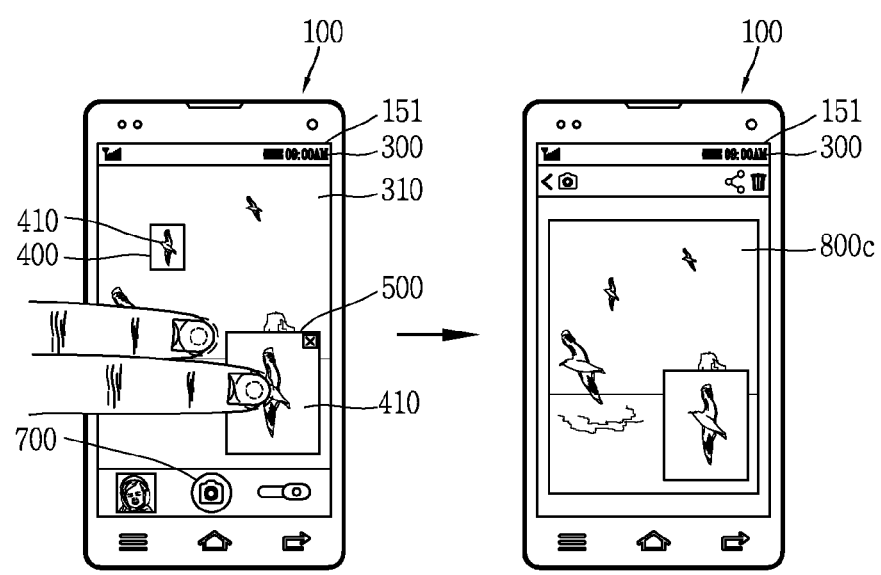
Figure 9B:
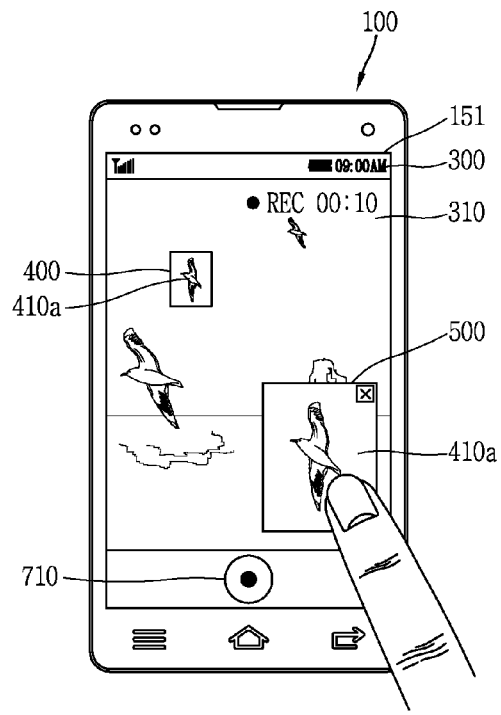
Figure 9B:
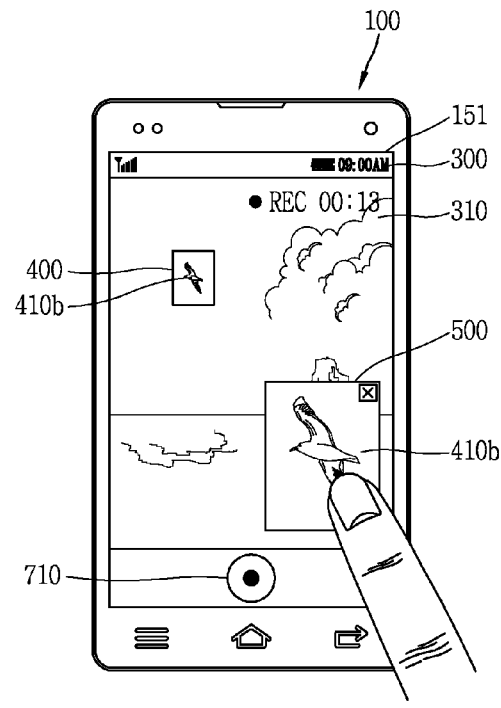
Figure 9B:
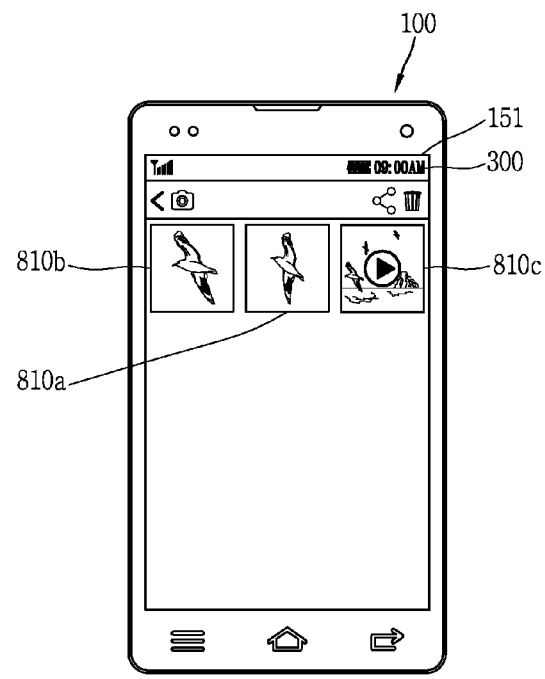
Figure 9C:
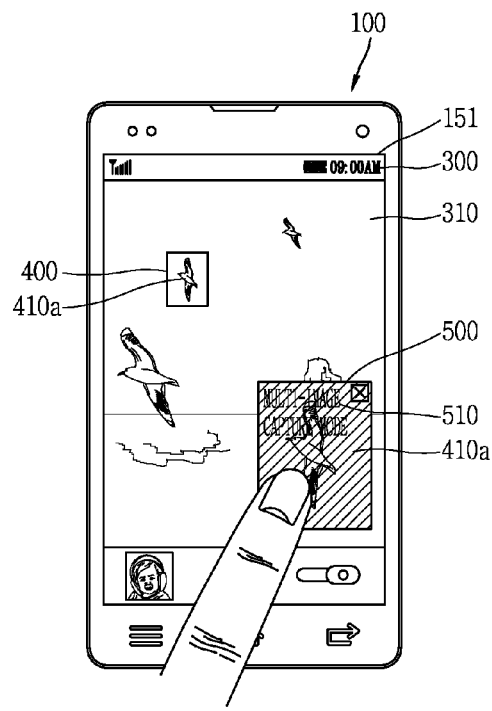
Figure 9C:
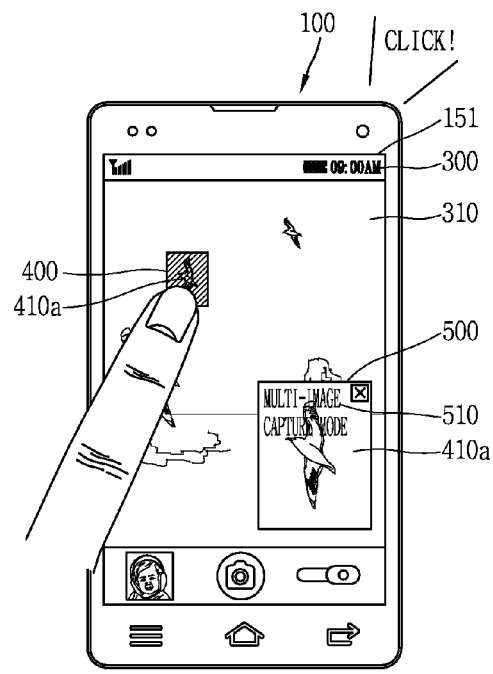
Figure 9C:
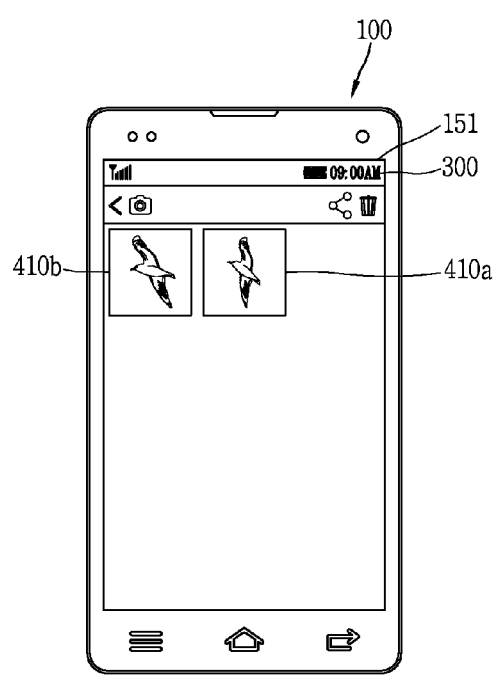
Figure 9C:
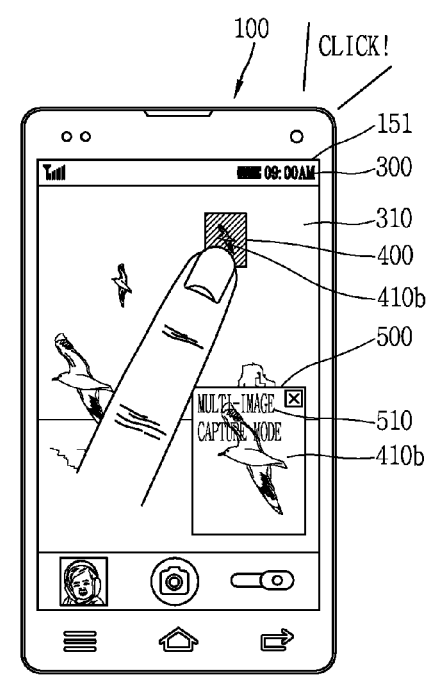

FIGS. 9A, 9B, and 9C are conceptual views illustrating a method of executing an image capturing function in a state in which a pop-up window is output.

The mobile terminal according to an exemplary embodiment of the present disclosure may capture the preview image 310 on the basis of a touch applied to an image capture button 700. Also, the control unit 180 may capture the preview image 300 on the basis of a touch applied to the region 300 in which the preview image is output, rather than to the image capture button 700. Also, when a touch is applied to the pop-up window 500, the control unit 180 may capture the preview image 410 corresponding to the portion 400 output on the pop-up window 500.

For example, as illustrated in (a) of FIG. 9A, when a touch is applied to the region 300 in which the preview image 310 is output in a state in which the preview image 310 and the pop-up window 500 are output, the control unit 180 may capture the preview image 310 and store a captured preview image 800a in a memory unit.

In another example, as illustrated in (b) of FIG. 9A, when a touch is applied to the region 500 in which the pop-up window is output, the control unit 180 may capture the preview image 410 which corresponds to the portion 400 of the region on which the preview image is output and which is output on the pop-up window 500, and store a captured preview image 800b in the memory unit.

In another example, as illustrated in (c) of FIG. 9A, when touches are applied to both the region 310 in which the preview image 300 is output and the region 500 in which the pop-up window is output, the control unit 180 may capture a screen 800c itself output on the display unit 151. Capturing the screen itself output on the display unit 151 may refer to capturing the state in which the preview image 310 and the pop-up window 500 are output, as is. Meanwhile, on the basis of a touch applied to the image capture button 700 in a state in which the pop-up window 500 is output, the control unit 180 may capture the screen itself output on the display unit 151.

Meanwhile, the control unit 180 may execute different image capturing functions on the preview image 300 and the pop-up window 500. Here, the different image capturing functions may include a video capturing function and a still image capturing function.

For example, as illustrated in (a) of FIG. 9B, the control unit 180 may execute video capturing on the preview image 310 in a state in which the pop-up window 500 is output. In detail, when a touch is applied to the video capture button 700 in a state in which the pop-up window 500 is output, the control unit 180 may perform video capturing on the preview image 310.

Here, as illustrated in (a) of FIG. 9B, when a touch is applied to the pop-up window 500, the control unit 180 may perform still image capturing on a preview image 410a corresponding to a portion 400 of the region on which the preview image 310 is output.

In (b) of FIG. 9B, the mobile terminal is moved during video capturing and a different preview image is displayed on the display unit 151. The preview image 410 corresponding to the portion 400 of the region 300 in which the preview image 310 is output may be changed as other preview image 310 is output on the display unit 151.

In this state, when a touch is applied to the pop-up window 500, the control unit 180 may capture a preview image 410b corresponding to the portion 400 included in the pop-up window 500.

Thereafter, a video file 810c obtained by capturing the preview image and the preview images 410a and 410b corresponding to the captured portion may be stored in the memory unit on the basis of a touch applied to the pop-up window during video capturing may be stored in the memory unit.

Here, the captured video file 810c may be a video file including the preview image with pop-up window (that is a screen as is output on the display unit) or a video file including only the preview image without the pop-up window. That is, the captured video file 810c may be varied according to a user setting.

Meanwhile, although not shown, reverse to the case illustrated in FIG. 9B, the control unit 180 may perform video capturing on the image (the preview image 410 corresponding to the portion 400) output on the pop-up window 500, and may perform still image capturing on the preview image 310.

Meanwhile, the control unit 180 may perform multi-image capturing in a state in which the pop-up window 500 is output. The multi-image capturing is defined as a function of capturing an image included in the pop-up window 500 each time a touch is applied to the region 300 in which the preview image 310 is output.

For example, as illustrated in (a) of FIG. 9C, when a preset type of touch (for example, a long touch) is applied to the pop-up window 500 in a state in which the pop-up window 500 is output, the control unit 180 may enter a multi-image capture mode 510. Thereafter, when a touch is applied to the portion 400 of the region 300 in which the preview image 310 is output, the control unit 180 may capture a preview image 400a corresponding to the portion 400 output on the pop-up window 500 as illustrated in (b) of FIG. 9C. Thereafter, in the state in which the multi-image capture mode 510 is entered, when a touch is applied to a different portion other than the portion 400, the control unit 180 may capture a preview image 410b corresponding to the different portion output on the pop-up window 500 as illustrated in (c) of FIG. 9C.

When a preset type of touch (for example, a long touch) is applied again to the pop-up window 500, the control unit 180 may release the multi-image capture mode 510. The at least one image 410a and 410b captured in the state in which the multi-image capture mode is entered may be stored in the memory unit.

As described above, according to an exemplary embodiment of the present disclosure, various types of image capturing may be performed using a pop-up window. Thus, the user may capture his or her desired image with respect to the entirety or a portion of a preview image, and may capture different images or perform multi-image capturing using a pop-up window, and thus, user convenience can be enhanced.

Hereinafter, a method of outputting a plurality of pop-up windows and a method of performing an image capturing function using a plurality of pop-up windows will be described in detail with reference to the accompanying drawings.

Figure 10A:
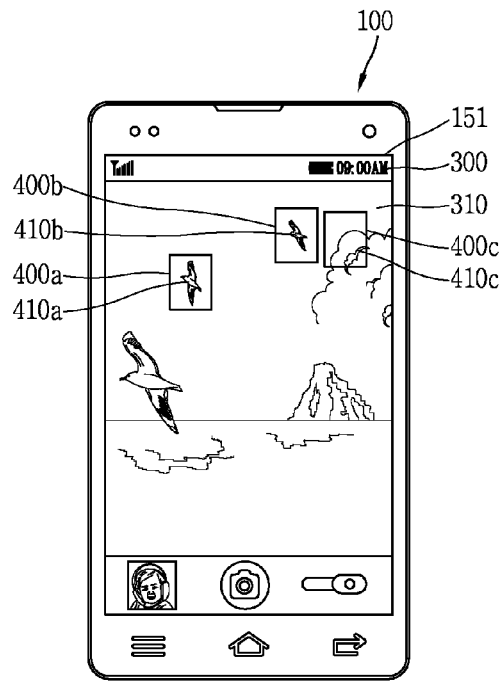
FIGS. 10A and 10B are conceptual views illustrating a method of outputting a plurality of pop-up windows in a state in which a preview image is output and a method of executing various image capturing functions using a plurality of pop-up windows.
Figure 10A:
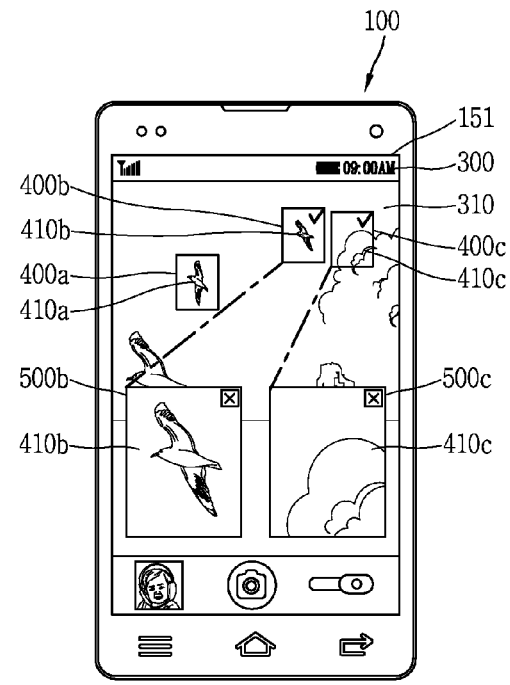
Figure 10A:
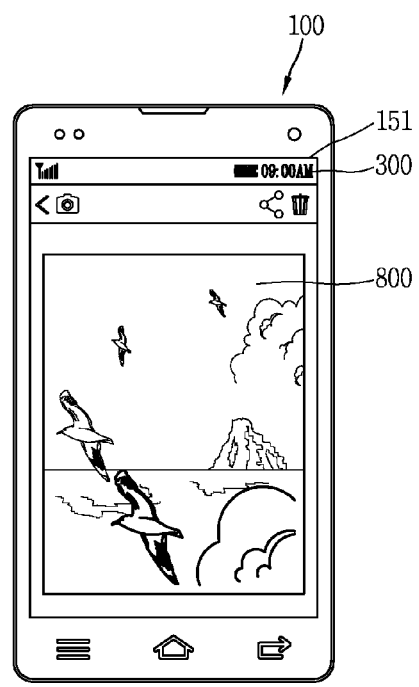
Figure 10B:
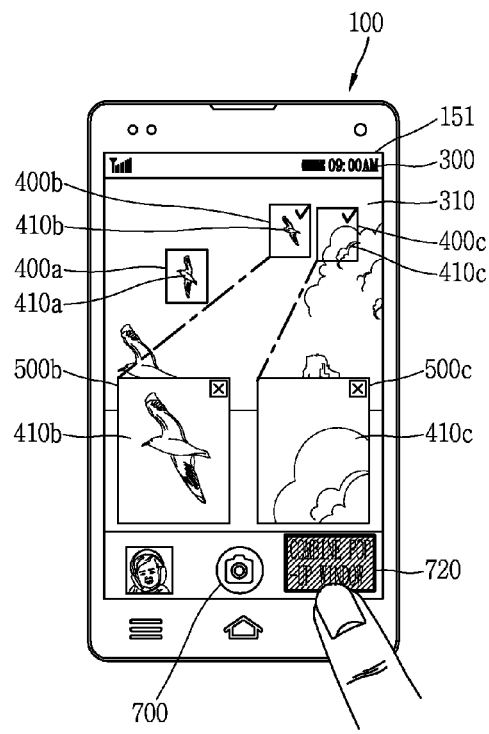
Figure 10B:
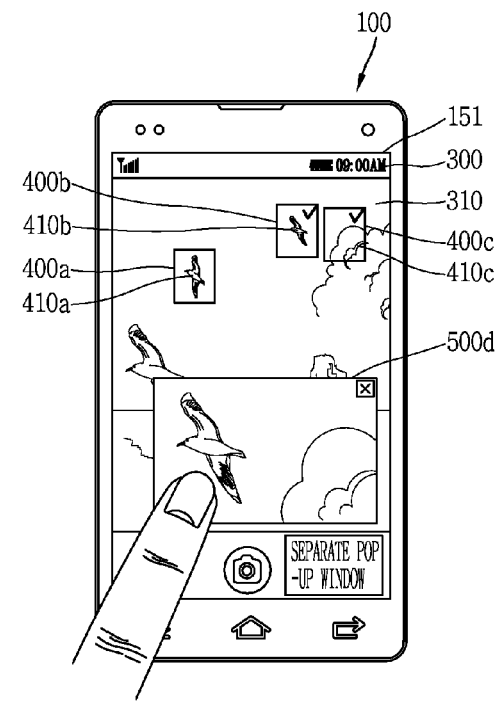
Figure 10B:
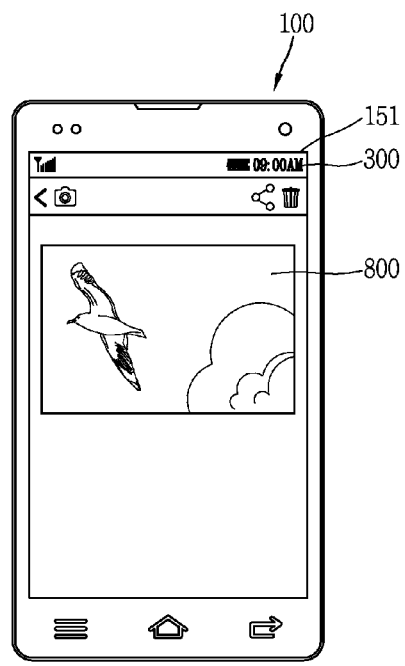

FIGS. 10A and 10B are conceptual views illustrating a method of outputting a plurality of pop-up windows in a state in which a preview image is output and a method of executing various image capturing functions using a plurality of pop-up windows.

The control unit 180 may display at least one region corresponding to a graphic object included in a preview image such that the at least one region is distinguished. In detail, the preview image 310 output on the display unit 151 may include at least one graphic object. The graphic object output on the preview image 310 may refer to a subject (object) desired to be imaged using a camera by the user.

That is, the preview image 310 may include at least one graphic object, and the graphic object may refer to a subject (object) included in an image received through the camera.

Meanwhile, when the preview image 310 is output, the control unit 180 may recognize (extract) the graphic object included in the preview image 310. Recognizing the graphic object may refer to extracting a single target object on the basis of a shape, a color, a depth value, a feature point, text, and an image of the graphic object.

Here, the graphic object may include any type of object desired to be imaged by the user, such as a building, text, a photograph, a picture, a face, a map, an electronic device (external device), an automobile, a robot, a barcode, a QR code, and the like.

Recognizing the graphic object may be performed on the basis of various schemes. For example, the graphic object included in the preview image may be extracted as a single target object using an image analysis scheme, a text extracting scheme, a face recognition scheme, and the like, with respect to the preview image (methods of extracting a graphic object included in an image, such as the image analysis scheme, the text extracting scheme, the face recognition scheme, and the like, are not the gist of the present disclosure, so detailed descriptions thereof will be omitted).

Also, the control unit 180 may distinguishably display at least one region corresponding to the graphic object included in the preview image with respect to a region corresponding to a graphic object occupying the largest area in the preview image, a region corresponding to a graphic object including a recognizable outline, and a region corresponding to a graphic object having brightness and chroma, at least one of which having a value equal to or greater than a threshold value, compared with other neighboring objects.

Thereafter, the control unit 180 may output at least two pop-up windows corresponding to at least two portions selected from among displayed portions.

For example, as illustrated in (a) of FIG. 10A, at least one portions 400a, 400b, and 400c corresponding to graphic objects included in the preview image 310 may be distinguishably displayed on the display unit 151. Thereafter, when at least two portions 400b and 400c are selected from the displayed portions, at least two pop-up window 500b and 500c may be output on the basis of the selection as illustrated in (b) of FIG. 10A.

Preview images corresponding to the selected portions among the displayed portions may be displayed in the at least two pop-up window 500b and 500c, respectively. For example, when the first portion 400b is selected from among the displayed portions, a preview image 410b corresponding to the first portion 400b may be output on the first pop-up window 500b, and when the second portion 400c is selected, a preview image 410c corresponding to the second portion 400c may be output on the second pop-up window 500c.

Here, when the graphic object included in the preview image is moved, the control unit 180 may perform a tracking function to move the displayed portion according to the movement. In a state in which the first pop-up window 500b is output according to selection of the first portion 400b, when the graphic object corresponding to the first portion 400b disappears, the control unit 180 may make the first pop-up window 500b disappear.

As described above with reference to FIG. 9A, when the at least two pop-up windows 500b and 500c are output, the control unit 180 may capture only a preview image, capture only an image included in a pop-up window, or capture a screen itself output on the display unit 151.

For example, in a state in which at least two pop-up windows 500b and 500c are output, when a touch is applied to an image capture button as illustrated in (b) of FIG. 10A, the control unit 180 may capture a screen 800 output on the display unit 151 as illustrated in (c) of FIG. 10A.

Meanwhile, the control unit 180 may execute various image capturing functions using a plurality of pop-up windows.

When at least two pop-up windows are output, the control unit 180 may output an icon 720 associated with the function of outputting images output on the at least two pop-up windows, to a single pop-up window. The function of outputting the icon to the at least one pop-up window may refer to a function of combining at least two pop-up windows and outputting a single pop-up window.

For example, as illustrated in (a) of FIG. 10B, when at least two pop-up windows are output, the control unit 180 may output the icon 720 associated with the function of outputting the images output on the at least two pop-up windows on a single pop-up window. When a touch is applied to the icon 720, as illustrated in (b) of FIG. 10B, the at least two pop-up windows 500b and 500c are combined and a single pop-up window 500d may be output. The images output on the at least two pop-up windows 500b and 500c may be combined to be output on the single pop-up window 500d. The images 410b and 410c output on the at least two pop-up windows 500b and 500c refer to preview images 410b and 410c corresponding to the portions 400b and 400c selected from among the at least one portion 400a, 400b, and 400c corresponding to graphic objects included in the preview image.

In a state in which the at least two pop-up windows are combined to the single pop-up window 500d, when a different preview image is output according to a movement of the mobile terminal or according to a movement of the graphic object, an image output on the single pop-up window 500d may be changed. Also, in a state in which the preview image corresponding to the at least two selected portions is output on the single pop-up window 500d, when at least one of the graphic objects corresponding to the selected portion disappears from the preview image, the control unit 180 may reduce the size of the single pop-up window 500d or may make the single pop-up window 500d disappear.

When a touch is applied to the single pop-up window 500d, the control unit 180 may capture the combined image output on the single pop-up window 500d, as a single image 800.

Through the configuration described above, an exemplary embodiment of the present disclosure may provide a user interface allowing the user to combine desired images and capture the combined image in a state in which the preview image is output.

Hereinafter, a method of executing various functions using a pop-up window will be described in detail with reference to the accompanying drawings.

Figure 11A:
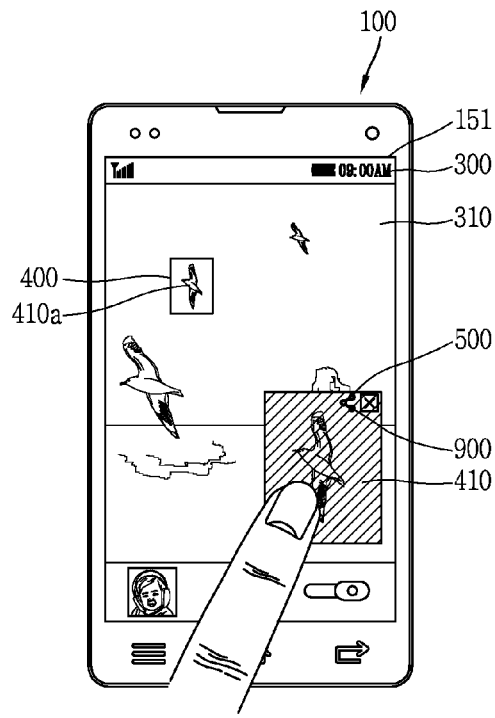
FIG. 11 is a conceptual view illustrating a method of executing various functions using a pop-up window in a state in which a preview image is output.
Figure 11B:
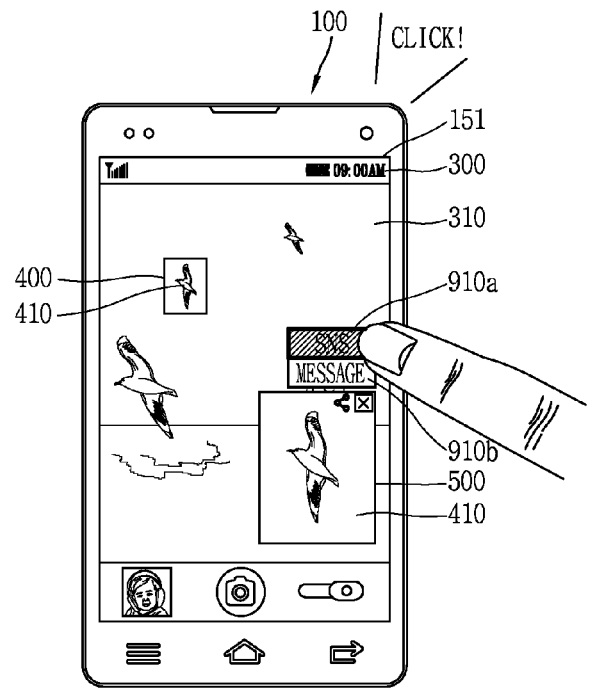
Figure 11C:
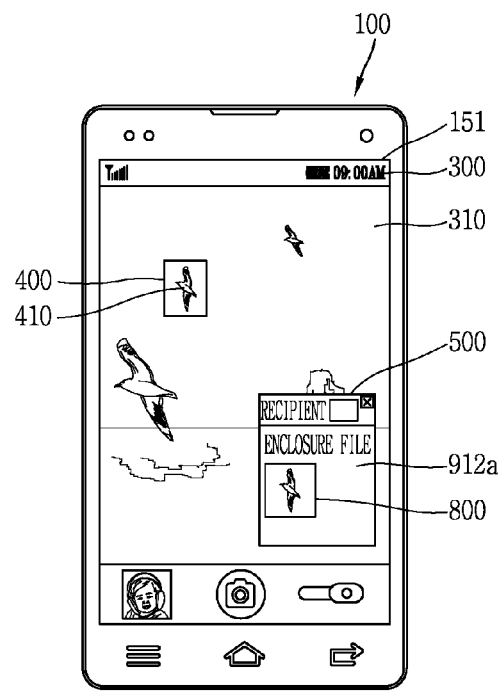

FIG. 11 is a conceptual view illustrating a method of executing various functions using a pop-up window in a state in which a preview image is output.

In a state in which a preview image is output, the control unit 180 may execute various functions using a pop-up window. For example, the control unit 180 may execute a function of sharing an image (image corresponding to a portion) output in a pop-up window 500.

As illustrated in (a) of FIG. 11, when a preset type of touch (for example, a long touch, double short touches, etc.) is applied to the pop-up window 500, the control unit 180 may output an icon 900 associated with a sharing function. When the icon associated with the sharing function is selected, a list 910b for selecting applications related to the sharing function may be output as illustrated in (b) of FIG. 11.

When any one of applications included in the list 910b is selected, the control unit 180 may capture an image (a preview image 410 corresponding to a portion) output on the pop-up window 500. Thereafter, an execution screen 912a of the selected application may be output on the pop-up window 500. As illustrated in (c) of FIG. 11, the preview image 410 corresponding to the portion may be enclosed as an enclosure file. Thereafter, the control unit 180 may share the enclosure file with other terminal or server or transmit the enclosure file to other terminal or server by using the execution screen of the application output on the pop-up window. Here, the control unit 180 may maintain outputting of the preview image 310 on the display unit 151.

Thus, in a state in which outputting of the preview image 310 is maintained, the user may share or transmit the preview image 410 corresponding to a portion of the region on which the preview image is output, and thus, user convenience can be enhanced.

Meanwhile, various types of notification information may be output on the pop-up window. For example, magnification information indicating a degree to which the preview image corresponding to a portion is magnified may be output on the pop-up window 500. Also, when a graphic object present in a portion is recognized, distance information indicating a distance between the mobile terminal and a subject corresponding to the graphic object may be displayed in the pop-up window 500.

As described above, according to an exemplary embodiment of the present disclosure, a novel user interface allowing for a preview image corresponding to a portion of a region on which the preview image is output to be magnified or reduced may be provided.

Also, according to an exemplary embodiment of the present disclosure, since different image capturing functions may be executed using a pop-up window, the user may capture a still image with respect to a desired portion even while capturing video.

Also, according to an exemplary embodiment of the present disclosure, the user demand for capturing an edited preview image or capturing and sharing only a portion of a preview image can be satisfied by using a pop-up window.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a camera;
   a display configured to output a preview image received through the camera; and
   a controller configured to control the display to:
      output, when a plurality of portions of the preview image are selected, a plurality of pop-up windows displaying a plurality of images corresponding to the plurality of portions while continuing to output the preview image, wherein when a prescribed type of touch is applied to one of the plurality of pop-up windows, the controller magnifies or reduces the corresponding one of the plurality of images displayed in the pop-up window,
      output an icon associated with a function of outputting the plurality of images displayed on the plurality of pop-up windows in a single pop-up window, and
      display the plurality of images displayed on the plurality of pop-up windows in the single pop-up window when an input is applied to the icon.

2. The mobile terminal of claim 1, wherein, for one of the plurality of pop-up windows, the controller selects a corresponding one of the plurality of portions of the preview window on a basis of a preset type of touch applied to the portion of the preview image.

3. The mobile terminal of claim 2, wherein when the preset type of touch applied to the portion of the preview image is a long touch, the controller sets, as the portion, a region having a reference size centered on a point to which the long touch has been applied.

4. The mobile terminal of claim 2, wherein when the preset type of touch applied to the portion of the preview image is a drag touch, the controller sets a region corresponding to a closed curve formed by a trace of the drag touch, as the portion.

5. The mobile terminal of claim 2, wherein when a preset type of touch applied to the portion of the preview image is a pinch-out touch, the controller sets the portion with respect to points to which the pinch-out touch has been applied.

6. The mobile terminal of claim 1, wherein a position in which one of the plurality of pop-up windows is outputted is determined on a basis of a position of a corresponding one of the plurality of portions of the preview image.

7. The mobile terminal of claim 1, wherein magnifying or reducing the image displayed in the pop-up window is performed according to varying of a size of the image on a basis of a preset type of touch applied to the pop-up window.

8. The mobile terminal of claim 7, wherein
   the preset type of touch applied to the pop-up window includes at least one of a pinch-in touch or a pinch-out touch, and
   the size of the image is increased when the pinch-in touch is applied to the pop-up window and decreased when a pinch-out touch is applied to the pop-up window.

9. The mobile terminal of claim 7, wherein the controller changes the size of the image such that the image, when magnified or reduced, centered on a point to which the preset type of touch has been applied.

10. The mobile terminal of 7, wherein the controller changes the size of the image while a size of the pop-up window is maintained.

11. The mobile terminal of claim 1, wherein
    an indicator identifying one of the plurality of portions is displayed on the display, and
    the indicator is formed to correspond to the edge of the portion.

12. The mobile terminal of claim 11, wherein a size of the portion is changed on the basis of a drag touch starting from the indicator, and
    an image corresponding to the resized portion is displayed in a corresponding one of the plurality of pop-up windows.

13. The mobile terminal of claim 1, wherein when a size of one of the plurality of portions is equal to or greater than that of a corresponding one of the plurality of pop-up windows, the controller controls the display to cease displaying the one of the plurality of pop-up windows.

14. The mobile terminal of claim 1, wherein when the one of the plurality of pop-up windows is being outputted, the controller executes an image capturing function on a basis of a touch applied to at least one of a region on which the preview image is output or a region on which the pop-up window is output.

15. The mobile terminal of claim 14, wherein
    the controller captures the preview image when a touch is applied to the region on which the preview image is output,
    captures the image corresponding to the portion when a touch is applied to the region on which the pop-up window is output, and
    captures a screen as is output on the display when touches are applied to both the region on which the preview image is output and the region on which the pop-up window is output.

16. The mobile terminal of claim 1, wherein the controller executes different image capturing functions on the preview image and one of the plurality of pop-up windows.

17. The mobile terminal of claim 16, wherein, when one of the plurality of pop-up windows is displayed and a touch is applied to the pop-up window while video is being captured on the preview image, the controller captures a still image of the one of the portions of the preview image corresponding to the pop-up window.

18. The mobile terminal of claim 1, wherein
    the controller displays at least one portion corresponding to a graphic object included in the preview image such that the at least one portion is distinguished, and
    outputs at least two pop-up windows corresponding to at least two portions selected from among the at least one displayed portion.

19. A method of controlling a mobile terminal, the method comprising:
    outputting a preview image received through a camera;
    when a plurality of portions of the preview image are selected, outputting a plurality of pop-up windows displaying a plurality of images corresponding to the selected portions, while the preview image is output;

magnifying or reducing one of the plurality of images displayed in one of the plurality of pop-up windows on a basis of a prescribed type of touch applied to the pop-up window;

outputting an icon associated with a function of outputting the plurality of images displayed in the plurality of pop-up windows on a single pop-up window; and displaying the plurality of imaged displayed in the plurality of pop-up windows on the single pop-up window when an input is applied to the icon.

* * * * *